United States Patent
Hayman et al.

(10) Patent No.: US 11,389,804 B2
(45) Date of Patent: Jul. 19, 2022

(54) SYSTEM AND METHOD FOR PROVIDING VOLUMETRIC EFFICIENCY IN A FOOD RECYCLING UNIT

(71) Applicant: Food Cycle Science Corporation, Cornwall (CA)

(72) Inventors: Mark Jonathan Brice Hayman, Ottawa (CA); Bradley Crepeau, Cornwall (CA); Meng Wang, Ottawa (CA)

(73) Assignee: FOOD CYCLE SCIENCE CORPORATION, Ontario (CA)

( * ) Notice: Subject to any disclaimer, the term of this patent is extended or adjusted under 35 U.S.C. 154(b) by 0 days.

(21) Appl. No.: 16/868,476

(22) Filed: May 6, 2020

(65) Prior Publication Data
US 2020/0353473 A1 Nov. 12, 2020

Related U.S. Application Data

(60) Provisional application No. 62/844,421, filed on May 7, 2019, provisional application No. 62/844,454, filed (Continued)

(51) Int. Cl.
*B02C 18/00* (2006.01)
*B02C 18/12* (2006.01)
(Continued)

(52) U.S. Cl.
CPC ...... *B02C 18/0092* (2013.01); *B01D 46/0038* (2013.01); *B01D 46/0043* (2013.01);
(Continued)

(58) Field of Classification Search
CPC ..... B02C 25/00; B02C 18/12; B02C 18/0092; B02C 18/067; B02C 23/18
(Continued)

(56) References Cited

U.S. PATENT DOCUMENTS

| 5,340,536 A | 8/1994 | Datar |
| 6,150,939 A | 11/2000 | Lin |

(Continued)

FOREIGN PATENT DOCUMENTS

| JP | 2006255592 | 9/2006 |
| KR | 19980047631 | 9/1998 |

(Continued)

OTHER PUBLICATIONS

Globosoft Food Cycler Processing Youtube.com—(https://www.youtube.com/watch?v=0QgiQ2puLJw) Mar. 9, 2019 (Year: 2019).*

(Continued)

*Primary Examiner* — Jessica Cahill
*Assistant Examiner* — Smith Oberto Bapthelus

(57) ABSTRACT

A food recycler includes a case, a control system within the case, and a set of user interface components that are usable to at least cause the control system to initiate a food recycling cycle. The food recycler also includes a motor within the case and a bucket that has a volumetric capacity between 2.51 and 10 liters. A filter system configured to accommodate air filters is also included in the case of the food recycler. To remove water from waste food items, the food recycler includes a drying component.

14 Claims, 32 Drawing Sheets

Related U.S. Application Data on May 7, 2019, provisional application No. 62/946,655, filed on Dec. 11, 2019.

(51) Int. Cl.
| | |
|---|---|
| *B02C 18/24* | (2006.01) |
| *B02C 23/26* | (2006.01) |
| *B02C 18/06* | (2006.01) |
| *B02C 23/18* | (2006.01) |
| *B01D 46/00* | (2022.01) |
| *B01D 46/02* | (2006.01) |
| *B01D 46/42* | (2006.01) |
| *C05F 17/986* | (2020.01) |
| *C05F 5/00* | (2006.01) |
| *C05F 17/907* | (2020.01) |

(52) U.S. Cl.
CPC ......... *B01D 46/02* (2013.01); *B01D 46/4227* (2013.01); *B02C 18/067* (2013.01); *B02C 18/12* (2013.01); *B02C 18/24* (2013.01); *B02C 23/18* (2013.01); *B02C 23/26* (2013.01); *C05F 5/002* (2013.01); *C05F 17/907* (2020.01); *C05F 17/986* (2020.01)

(58) Field of Classification Search
USPC ..................................................... 241/65, 62
See application file for complete search history.

(56) References Cited

U.S. PATENT DOCUMENTS

| | | | | |
|---|---|---|---|---|
| 7,240,865 B2* | 7/2007 | Choi | ........................ | A61L 11/00 |
| | | | | 241/100 |
| 9,308,535 B2* | 4/2016 | Delgado | ............... | C05F 17/907 |
| 9,597,620 B2 | 3/2017 | Verdegan | | |
| 9,895,726 B1 | 2/2018 | Atkinson | | |
| 10,065,196 B1* | 9/2018 | Tran | ........................ | A22C 11/00 |
| 10,906,046 B2 | 2/2021 | Crepeau | | |
| 2004/0251339 A1* | 12/2004 | Strutz | ................... | E03C 1/2665 |
| | | | | 241/30 |
| 2008/0067270 A1* | 3/2008 | Strutz | .................... | B02C 25/00 |
| | | | | 241/36 |
| 2009/0113791 A1 | 5/2009 | Bertin | | |
| 2010/0140248 A1* | 6/2010 | Yi | ........................... | F24C 7/087 |
| | | | | 219/391 |
| 2011/0151553 A1 | 6/2011 | Cruson | | |
| 2012/0021504 A1 | 1/2012 | Bradlee | | |
| 2012/0034350 A1* | 2/2012 | Gard | .................... | H05B 6/6411 |
| | | | | 426/242 |
| 2012/0298658 A1 | 11/2012 | Bosetti | | |
| 2013/0263786 A1 | 10/2013 | Meisel, III | | |
| 2014/0117126 A1* | 5/2014 | Ceru | ....................... | B02C 23/36 |
| | | | | 241/23 |
| 2016/0022112 A1 | 1/2016 | Davenport | | |
| 2016/0207845 A1 | 7/2016 | Delgado | | |
| 2016/0295906 A1* | 10/2016 | Jacobsen | ................... | A23L 5/34 |
| 2017/0226466 A1* | 8/2017 | Grillo | ..................... | B02C 23/02 |
| 2017/0260111 A1* | 9/2017 | Maghas | ................ | C05F 17/993 |
| 2017/0349501 A1 | 12/2017 | Buzruk | | |
| 2018/0093814 A1* | 4/2018 | Espinosa | ................... | A47F 3/04 |
| 2018/0148391 A1 | 5/2018 | Ashbee | | |
| 2019/0083989 A1* | 3/2019 | Tran | ....................... | B02C 23/00 |
| 2020/0147617 A1 | 5/2020 | Atkinson | | |
| 2020/0148604 A1 | 5/2020 | Atkinson | | |
| 2020/0353474 A1 | 11/2020 | Crepeau | | |

FOREIGN PATENT DOCUMENTS

| | | |
|---|---|---|
| KR | 100692243 | 3/2007 |
| KR | 20090103453 | 10/2009 |
| KR | 20090123375 | 12/2009 |
| KR | 101332453 | 11/2013 |
| KR | 101461608 | 12/2014 |
| WO | WO 2009157744 | 12/2009 |
| WO | WO 2017083944 | 5/2017 |

OTHER PUBLICATIONS

FoodCycler Manual designated for Model FC-30, the date is based on the youtube (Model FC-30) Previously submitted. (Year: 2019).*

* cited by examiner ized within a bucket rotates and pulverizes or crushes the waste food as part of the recycling process. The control system 214 will

SYSTEM AND METHOD FOR PROVIDING VOLUMETRIC EFFICIENCY IN A FOOD RECYCLING UNIT

PRIORITY CLAIM TO RELATED APPLICATIONS

This application claims priority to U.S. Provisional Patent Application No. 62/844,421, filed May 7, 2019, U.S. Provisional Patent Application No. 62/844,454, filed May 7, 2019, and U.S. Provisional Patent Application No. 62/946,655, filed Dec. 11, 2019, the contents of which are incorporated herein by reference in their entirety.

TECHNICAL FIELD

The present disclosure relates to food recyclers and particularly to a new design which enables a larger bucket for receiving waste food than is currently possible in the existing food recyclers in the marketplace.

BACKGROUND

Food recycling devices are becoming popular appliances, such as the FoodCycler FC-30 provided from Food Cycle Science. The FC-30 is an eco-friendly machine that converts waste food into a highly mature, nutrient-rich soil amendment that can be put in a garden. Users can place waste food into a bucket and press a button and after the recycling cycle is complete, the user has fertilizer which can be used in the garden.

FIGS. 2A and 2B illustrate an example of the existing art and the structure of the FC-30 unit. FIGS. 2A and 2B illustrate different views of a food recycler 200. A top cover 202 includes the controlled button and cycle status indicators and includes a lid 204. A user may open the lid, which may reveal a bucket (not shown) which is received in a bucket container 212 and is used to receive the waste food.

An important aspect of the food recycler 200 is its size. The food recycler 200 is designed for home use and thus must be an appropriate size for fitting on top of a countertop in a kitchen. For example, the height of the food recycler 200 is approximately 360 mm (approximately 14 inches) 206. The width 208 is approximately 270 mm (approximately 10.6 inches) and the length 210 is approximately 310 mm (approximately 12.2 inches). In the design of the food recycler 200, this size has been proven to be preferable to purchasers.

The bucket in the bucket container 212 can receive 2.5 liters of food waste. The other components in the food recycler 200 include a motor 216 positioned below the bucket container 212. The food recycler 200 also includes a gearbox 224. Power from the motor 216 is transferred to the gearbox 224 through the transfer case 218. As can be shown, the transfer case 218 is also located below the bucket container 212. Electronic control system 214 is positioned in the lower portion of the interior of the food recycler 200 and extends a part of a side of the bucket container 212.

A platform 232 is provided upon which the bucket can rest. The platform can include heating elements which can be used to heat the bucket as part of the recycling process. The control system 214 is programmed to perform the recycling process which can include modes such as a heating mode, a dehumidifying mode or drying mode, and a crushing mode in which a crushing member configured within the bucket rotates and pulverizes or crushes the waste food as part of the recycling process. The control system 214 will control fans 222, the motor 216 and/or other elements to carry out the recycling process.

The amount of energy used in the food recycler 200 is about 8 kilowatt hours per cycle or per 2.5 liters of waste food. Much of the energy is used in grinding the waste food in the bucket and also through heating the bucket. A heating element or a heat plate (not shown) is configured below the bucket to transfer heat to the metal bucket in order to warm up the waste food as part of the recycling process. The heating element acts as a resistor as a current is passed through it to cause heat, which is transferred to the metal bucket and heat the food waste.

Managing the potential odor from the waste food is important. Thus, the food recycler 200 includes a fan 222 and an air channel 220 that pulls air and humidity from the bucket 212 and communicates the air and humidity through a channel 230 to two air filters which have exhausted ports 228. In this manner, odor can be filtered through a filtering material which can be contained in the air filters 226. It is noted that the current air filters are positioned at the bottom of the unit such that air flows from the bottom up through the filters and out the exhaust ports 228. There are several challenges with the structure shown in FIGS. 2A and 2B. The first is the size of the bucket 212 can be somewhat restrictive with respect to the amount of waste food the user desires processing. The second challenge relates to how much energy the system uses in a cycle a processing load of waste food.

FIG. 2C shows a grinding unit 250 in existing food recyclers. The grinding unit 250 is typically positioned at the bottom of a bucket and configured to be mechanically connected to the motor 216 through the transfer case and gearbox 218. The grinding unit 250 includes a central component 252 that has 3 different arms or extensions. These extensions are used for grinding the waste food within the bucket. A first extension 268 extends horizontally from the central component 252 and at a distal end includes a projection 270. Another extension 264 is similarly configured with a projection 266 at the distal end. The configuration of the first 2 extensions are designed such that they are complementary with a lower or bottom surface of a chopping component 254 which is attached to an inner wall of the bucket. Chopping component 254 has a first extension 256 extends horizontally into the interior volume of the bucket. A second extension 258 is vertical and downward in direction and attaches to third extension 260 which again is horizontal. A third arm 262 from the central component 262 is configured to be complementary to an upper surface of the chopping component 254. As can be seen in FIG. 2C, the arm 262, as it rotates, is closely aligned with a top surface of the extensions 256, 258 and 260.

As waste food is placed in the bucket, the grinding component 250 will rotate and the respective arms or extensions, along with the chopping component 254, will cause the food, bones, or other harder elements to be chopped or ground down as part of the recycling process.

FIG. 2D illustrates a top view of the bucket and the grinding unit 250. This view gives a better understanding of the curvature of extension 268 and 264 as well as the nature of the extension 262 being straight.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope. The principles herein are described and explained with additional specificity and detail through the use of the accompanying drawings in which.

DETAILED DESCRIPTION

Figure 1:
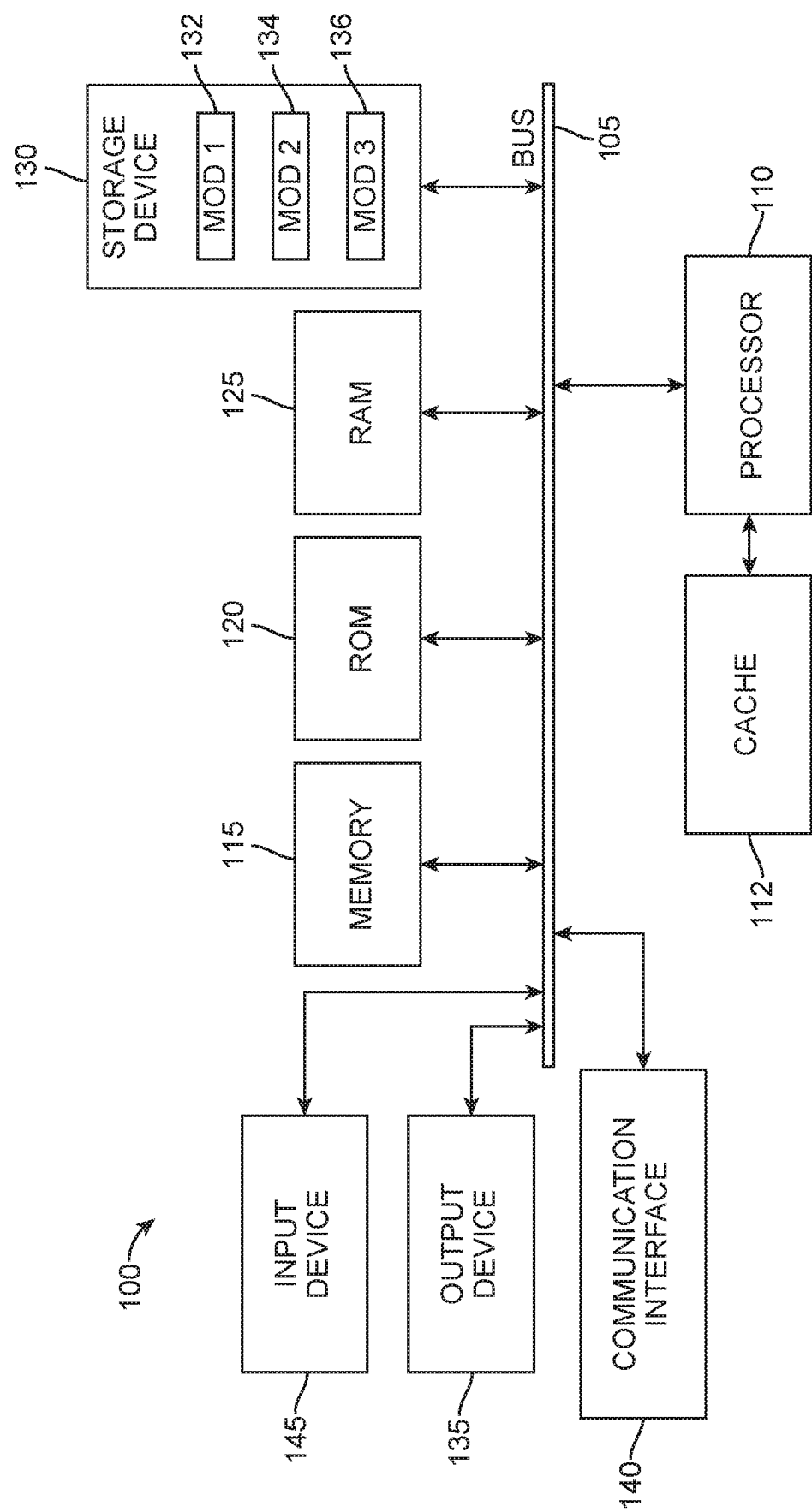
FIG. 1 illustrates an example system configuration, according to an aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The following description is organized around a number of different technologies. It is noted that this is not meant to imply that the present application is focused on particular separate embodiments. Any of the features described in any of the examples below can be combined with any other feature in order to arrive at an improved food recycling appliance. The features are generally organized in terms of an example that focuses on volumetric efficiency, another example that focuses on energy efficiency, yet another example that focuses on a grinding tool configured within a bucket of the food recycling appliance, another example focusing on an Internet of Things (IoT) aspect of this disclosure which enables identification of contents within a bucket of a food recycling appliance, a communication of that identification to a central server and for other control mechanisms, as well as an example focusing on an improvement with respect to odor control by introducing a replaceable filter and various configurations for utilizing replaceable filters within the context of the food recycling appliance. As noted above, various features could be combined to arrive at particular examples. For example, a food recycling appliance could include one of the described new grinding components in connection with a replaceable filter contained within the lid of the food recycling appliance. Another example improvement could include an improved size of the bucket with the components configured internally to enable for a larger bucket in the horizontal XY direction, with the addition of an RF heating component configured within the lid of the food recycling appliance.

This disclosure now turns to an introductory description of the various new features associated with an improved food recycling appliance.

One feature that is needed in the art is an improved system which is reconfigured and reengineered to improve the volumetric efficiency of the bucket while maintaining the overall volume or size of the food recycler units. It is important that the size of the unit be convenient for use on a countertop. If the food recycling unit is too tall, then users cannot access the bucket from the top surface of the food recycler because there is an insufficient space between the food recycler and an overhead cabinet. A bucket size of 2.5 liters is not sufficiently large enough for the amount of food waste that a home produces. The challenge as outlined above is that the size of the food recycler 200 cannot be enlarged or it will be undesirable for use on the countertop. This tension between the desired size of the bucket and the desired overall volumetric size of the food recycling unit represents a technical problem inasmuch as current food recycler units are already engineered and in production with 2.5 liters buckets. There is an established configuration which is becoming popular in the marketplace and yet given the configuration of the internal components within the limited overall volume, it is not possible to simply enlarge the bucket size. Accordingly, the following description provides an improved interior configuration for a food recycler designed for home use and which maintains the same overall volume of the food recyclers shown in FIGS. 2A and 2B.

The overall volume of the entire food recycler is approximately 30 liters. By implementing the reconfiguration disclosed herein, the bucket volume can increase to over 2.5 liters and up to potentially 15-20 liters.

To enable improved volumetric efficiency for the bucket to be 2.51 liters or more, but remain within an overall device volume of approximately 30 liters, the improved food recycling unit moves the motor and transfer case from beneath the bucket container 212 to a position on a side of a larger bucket container such that the primary mechanical component beneath the bucket is the gearbox. Thus, the interaction between the gearbox and the transfer case and motor has been reengineered in order to allow the bucket to sit lower within the device.

The air filters are reconfigured to be positioned within the device above the motor and transfer case. New exhaust ports near the top of the device are developed such that air and humidity can be released from the system. By reconfiguring the internal components of the food recycler, the improved device can accommodate a bucket having a volume of between 2.51 liters and 20 liters, depending on the size of the various components. The above description improves the size of the bucket in the vertical direction or Z direction.

Another example configuration increases the bucket volume in the horizontal XY direction. In this example, the motor, gearbox, and transfer case are all configured below the bucket container. Configured at one end of the unit is the air filter, fan and air communication channels for enabling air flow from the interior of the bucket through the air filter system. By moving the motor, gearbox, and transfer case, as well as the control system, to positions below the bucket container, improved volumetric efficiency can be experienced in the horizontal XY direction such that the bucket volume capacity can be 2.51 liters or greater.

In one aspect, a food recycler includes a food recycler case that contains a controller, a motor in communication with the controller and configured within the food recycler case, a bucket contained within the food recycler case that is configured to receive waste food and a drying component configured to remove water from the waste food. The food recycler is configured for use on a countertop. The components within the food recycler are redesigned and reconfigured such that a ratio of a first volume of a bucket that receives waste food relative to the overall volume of the food recycler case is between 0.0717 and 0.2857. The overall volume of the food recycler case is designed for use on a countertop and is approximately 30-35 liters or less. For instance, based on the range for the ratio of the first volume of the bucket and the overall volume of the food recycler, the overall volume of the food recycler can be between 8.79 liters and 35 liters, inclusive. The height of the food recycler, in order to be usable on the average countertop, is 15 inches or less, or 360 mm or less.

In another example, a food recycler includes a controller, a motor in communication with the controller, a grinding mechanism in mechanical communication with the motor, a bucket contained within the food recycler that is configured to contain the grinding mechanism and configured to receive waste food and a drying component configured to remove water from the waste food. The food recycler can be configured to have an overall appliance volume of 35 liters or less. The controller, the motor, and the drying component can be configured within the food recycler to enable the bucket to have a capacity to receive waste food of between 2.51 liters to 10 liters.

Another aspect of this disclosure focuses on improved energy usage by introducing an RF heating component. An example food recycler includes a controller, a motor in communication with the controller, a grinding mechanism in mechanical communication with the motor, a bucket contained within the food recycler that is configured to contain the grinding mechanism and configured to receive waste food and an RF heating component, in electrical communication with the controller, the RF heating component configured to provide radio waves into the bucket for heating the waste food as part of a food recycling process, wherein the food recycling process consumes 0.1 kilowatt hours of energy per 100 grams of waste food. The RF heating component can be configured in a lid of the food recycler or in some other position in order to transmit RF electromagnetic waves into an interior portion of the bucket.

An example method with respect to the RF heating component can include receiving waste food within a bucket contained within a food recycling appliance, heating the waste food within the bucket using an RF heating component, drying the waste food within the bucket and grinding the waste food with a grinding component contained within the food recycling appliance.

Another aspect of this disclosure relates to a new grinding component. A grinding component includes a primary column mechanically attached to a motor system and a first curved arm extending from the primary column at a first elevation and having a first vertical surface and a second vertical surface, the first curved arm having a first end connected to the primary column and having a first arm distance between a first end vertical surface at the first end and a wall of a bucket containing the grinding component. The first curved arm can have a second end that is distal from the primary column and a second arm distance between a second end vertical surface at the second end and the wall of the bucket. The first curved arm can have a flat top surface that is configured to travel beneath a fixed chopping projection from the wall of the bucket when the primary column rotates as controlled by the motor system and the first curved arm can have a sharp edge projecting from the flat top surface on a side of the first curved arm that is opposite the first vertical surface. The grinding component further includes a second curved arm extending from the primary column at a second elevation and can have a first curved vertical surface and a second flat vertical surface. The second curved arm can be configured to travel above the fixed chopping projection from the wall of the bucket when the primary column rotates as controlled by the motor system.

Another aspect of this disclosure relates to food recycler including an Internet of Things aspect. The food recycler includes one or more a controller, a motor in communication with the controller, a grinding mechanism in mechanical communication with the motor, a bucket contained within the food recycler that is configured to contain the grinding mechanism and configured to receive waste food, a sensor component that senses a characteristic of the waste food to yield sensor data, and a wireless communication component connected to the controller which communicates with a network. A drying component can be configured to remove water from the waste food. The sensor data can be transmitted to a server via the wireless communication component and wherein the sensor data is used to characterize a first amount of edible food from the waste food and a second amount of non-edible food from the waste food.

The disclosure further includes an aspect of odor control. In this regard, a food recycler includes one or more of a controller, a motor in communication with the controller, a grinding mechanism in mechanical communication with the motor, a bucket contained within the food recycler that is configured to contain the grinding mechanism and configured to receive waste food, a receiving cavity which is configured to receive a replaceable filter bag and an air circulation system configured to circulate air from the bucket through the receiving cavity containing the replaceable filter bag. The food recycler can be configured to have an overall appliance volume of 35 liters or less. The controller, the motor, the receiving cavity, and the air circulation system can be configured within the food recycler to enable the bucket to have a capacity to receive waste food of between 2.51 liters to 10 liters, inclusive.

DETAILED DESCRIPTION

The present disclosure addresses the issues raised above. In this disclosure, several different examples food recyclers will be presented which cover different types of re-configurations of internal components such that the volumetric efficiency of the bucket contained within the food recycler can be increased. As noted above, an important feature of the new food recyclers disclosed herein is that they enable the same overall functionality of recycling food but in a new configuration that increases the volumetric efficiency or the volume of the bucket use within the system that receives waste food. The prior art bucket volume was 2.5 liters. This size is not sufficient for the desired volume that most people have. Accordingly, the new configurations present innovative solutions to increase the volume of the bucket, but within the same overall case size of approximately 30 liters. These factors are important inasmuch as the desired use of the food recycler is in the home and thus on a kitchen counter top, for example.

One aspect of this disclosure will relate to the control system that is used to manage and control the recycling process. Part of this disclosure can include changes or improvements to the control system such that the food recycling process takes less time or is performed in a more energy efficient manner. The disclosure provides a system, method and computer-readable storage device related to the control system. As will be described in more detail herein, the control system will manage the various components such as the motor, a heater, a dehumidification system, a fan, and the user interface.

First, a general example computer system shall be disclosed in FIG. 1, which can provide some basic hardware components making up a server, a node, a controller, or other computer system or system for controlling cycles and processing of waste food according to the concepts disclosed herein. FIG. 1 illustrates computing system architecture 100, according to an aspect of the present disclosure. As shown in FIG. 1, the components of the system architecture 100 (or simply system 100) are in electrical communication with each other using a connector 105. Exemplary system 100 includes a processing unit (CPU or processor) 110 and a system connector 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules/services can control or be configured to control the processor 110 to perform various actions. Other system memory 115 may be available for use as well. The memory 115 can include multiple different types of memory with different The processor 110 can include any general purpose processor and a hardware module or software module/service, such as service 1 132, service 2 134, and service 3 136 stored in storage device 130, configured to control the processor 110 as well as a special-purpose processor where software instructions are incorporated into the actual processor design. The processor 110 may be a self-contained computing system, for example, containing multiple cores or processors, a bus (connector), memory controller, cache, etc. A multi-core processor may be symmetric or asymmetric.

To enable user interaction with the computing device 100, an input device 145 can represent a variety of input mechanisms, such as a microphone for speech, a touch-sensitive screen for gesture or graphical input, a keyboard and/or mouse, e.g., for motion input and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and/or hybrids thereof.

The storage device 130 can include software services 132, 134, 136 for controlling the processor 110. Other hardware or software modules/services are contemplated. The storage device 130 can be connected to the system connector 105. In one aspect, a hardware module that performs a particular function can include the software component stored in a computer-readable medium in connection with the necessary hardware components, such as the processor 110, connector 105, display 135, and so forth, to carry out the function.

Figure 3A:
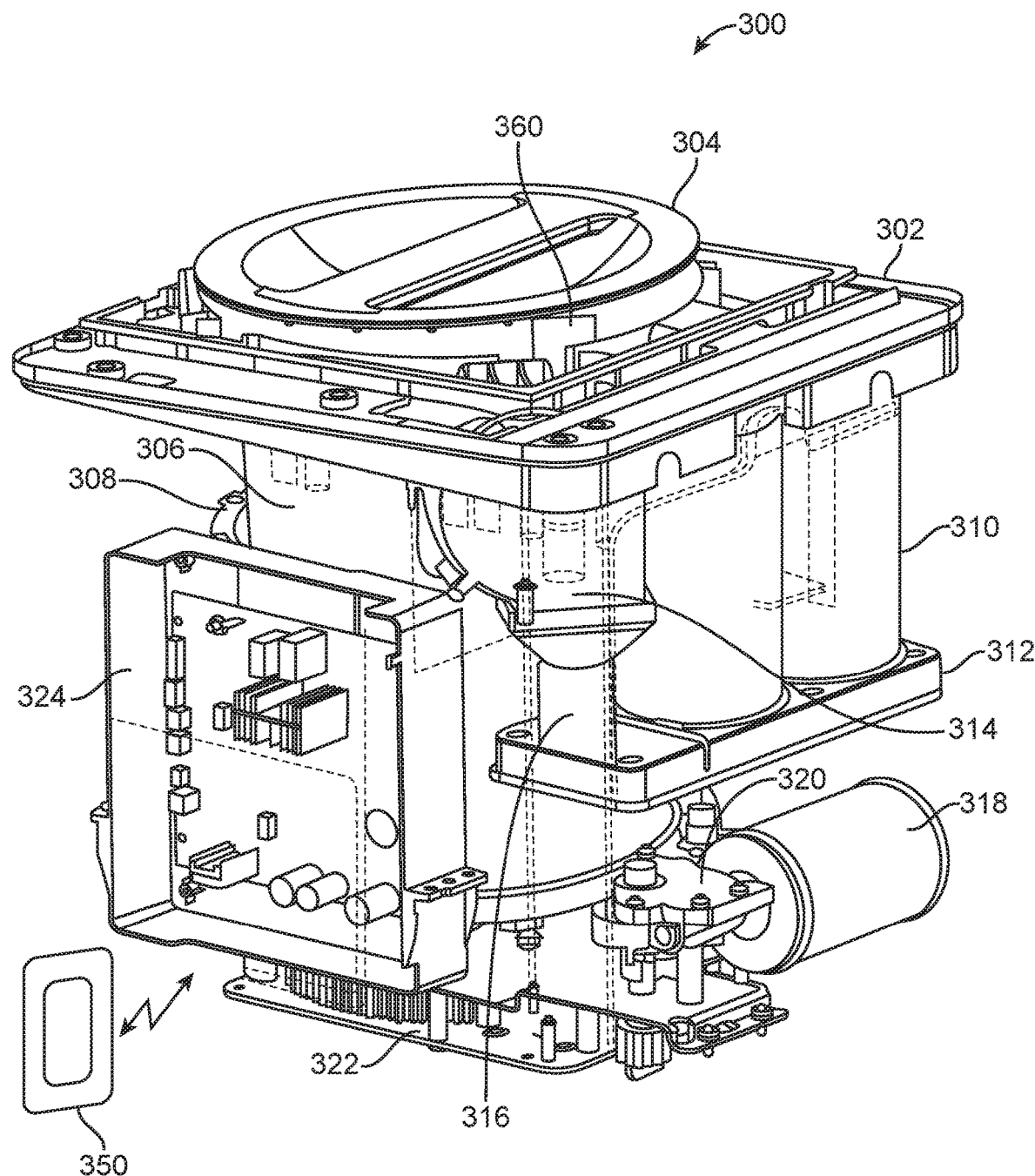
FIGS. 3A and 3B illustrate a first example of a food recycler.

FIG. 3A illustrates one example configurations for food recycler. It is noted that in the various examples shown, that any particular feature shown in any example can be combined with any other example and that the discussion around the respective figures is not intended to describe separate embodiments that are not interchangeable with respect to individual features.

FIG. 3A shows one optional example in which the internal configuration of the food recycler 300 is shown such that the motor and gearbox layout positions are changed as well as the configuration of the air filters in the same overall volume size. A goal of this example is to provide more space in the horizontal or Z direction which can enable an increase of the debt of the bucket to be larger than existing configurations. The food recycler 300 includes a lid 304 which can be twisted into an open and unlocked position from a closed and locked position. Handle is shown on the lid with a concave surface to enable user to be able to grab the handle.

Figure 2A:
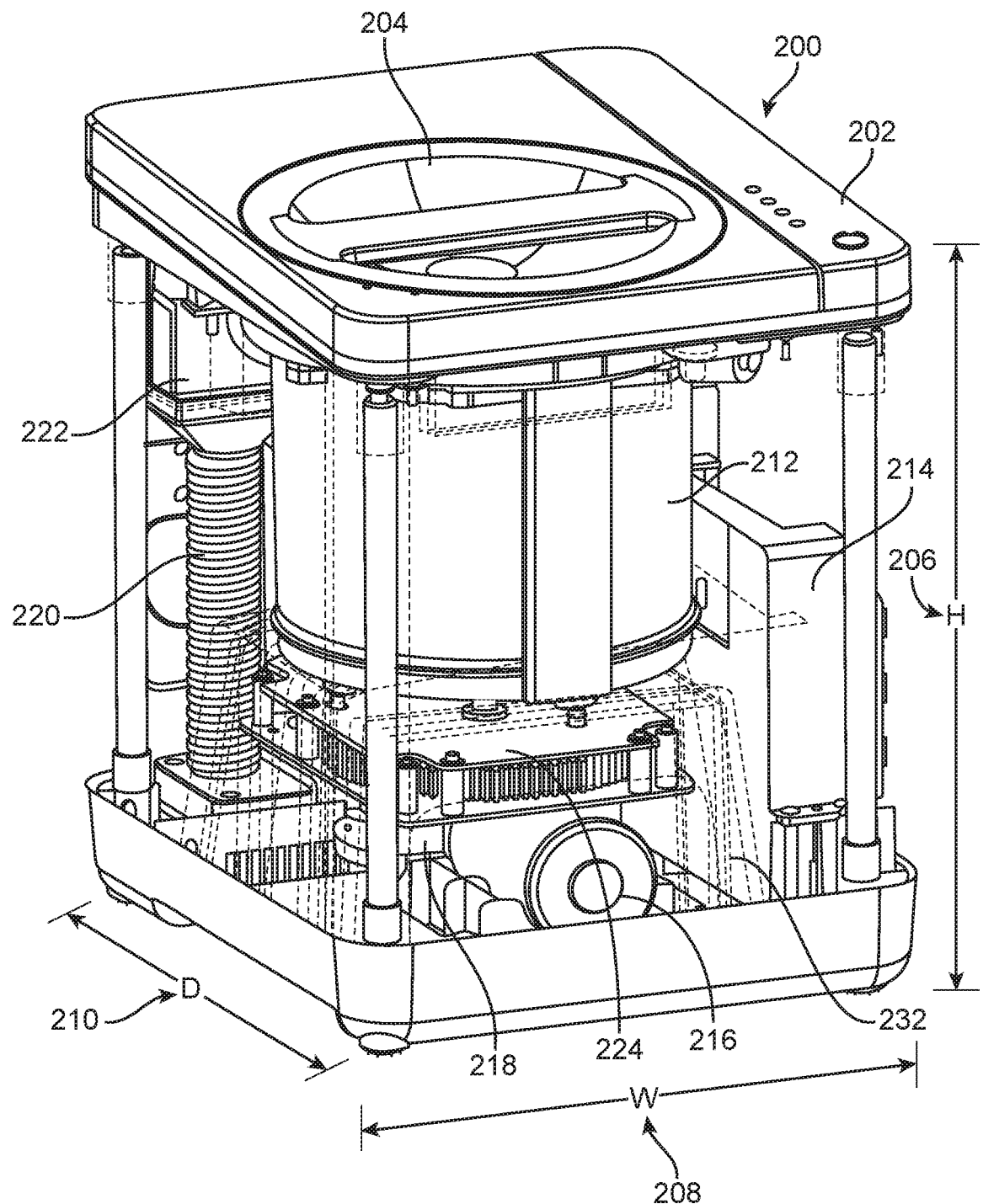
FIGS. 2A and 2B illustrate an existing food recycler.
Figure 3B:
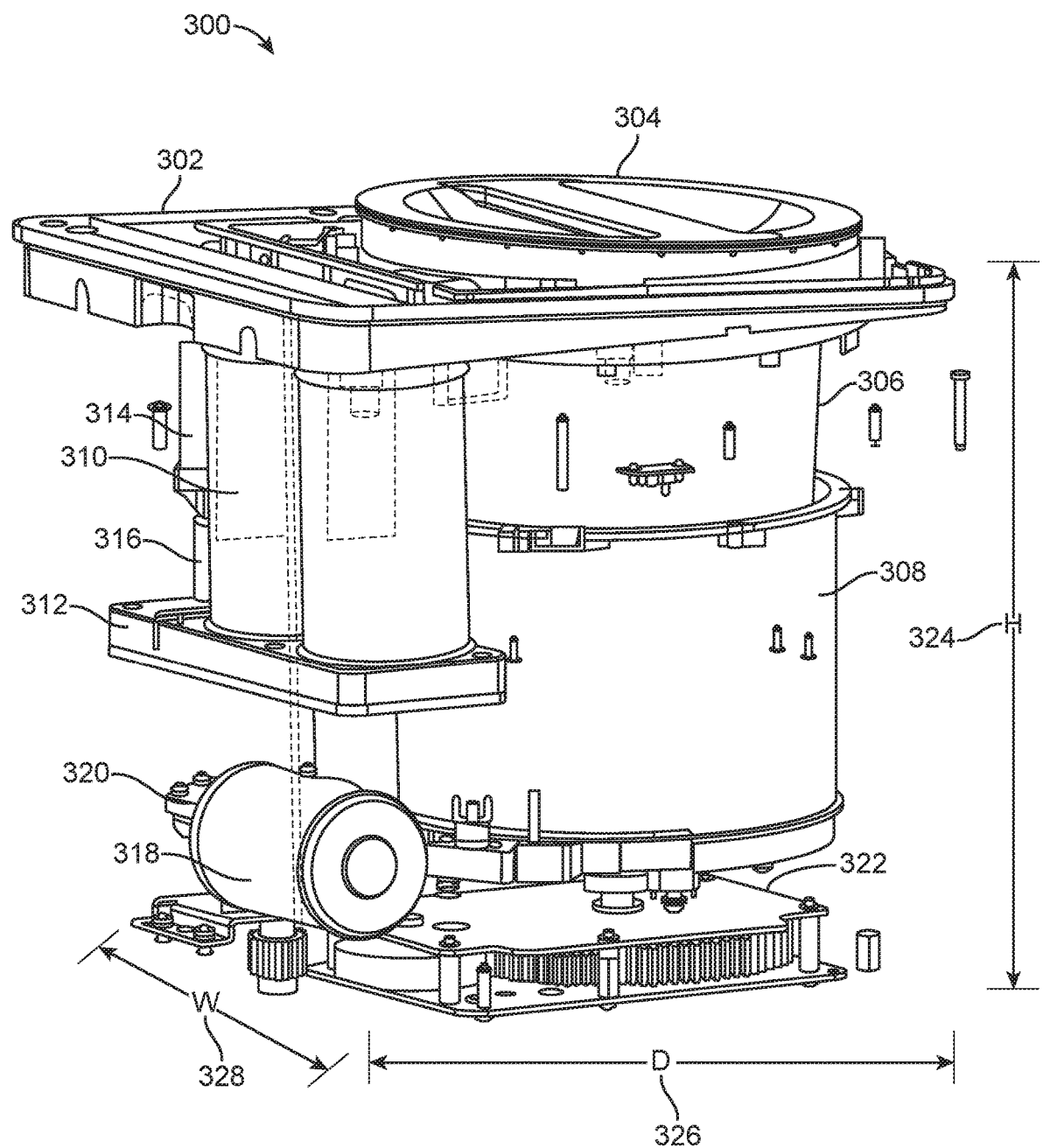

A top supporting structure 302 is shown in FIGS. 3A and 3B. FIGS. 3A and 3B do not show the exterior surface of a cover to the food recycler 300, only the supporting structure. The external surface of the food sector 300 can have a similar look to the cover 202 shown in FIG. 2A, by way of example. Indicators can be provided to the user on the cover of the food recycler 300. The user interface for the food recycler 300 can include a number of different types of user interface. Typically, a button is pressed by the user to start the cycle. Lights can be presented to the user to identify the status of a cycle. The user interface could also be graphical in nature or through a touch sensitive screen which can present data about the status of the cycle and enable the user to initiate or stop the cycle.

The reconfiguration of components within FIGS. 3A and 3B are as follows. The motor 318 is moved from being below the bucket, as in the prior art, to being low in the food recycler and to the side of the expanded bucket 306. The bucket 306 is within a bucket container 308. A Fan 314 and an air duct 316 connect through another air duct 312 with one or more air filters or a filtering system 310. The air filters contain a material through which the air flows for deodorizing. An exhaust port can be configured at one end of the air filters 310 for releasing the odorless air into the room.

Figure 2B:
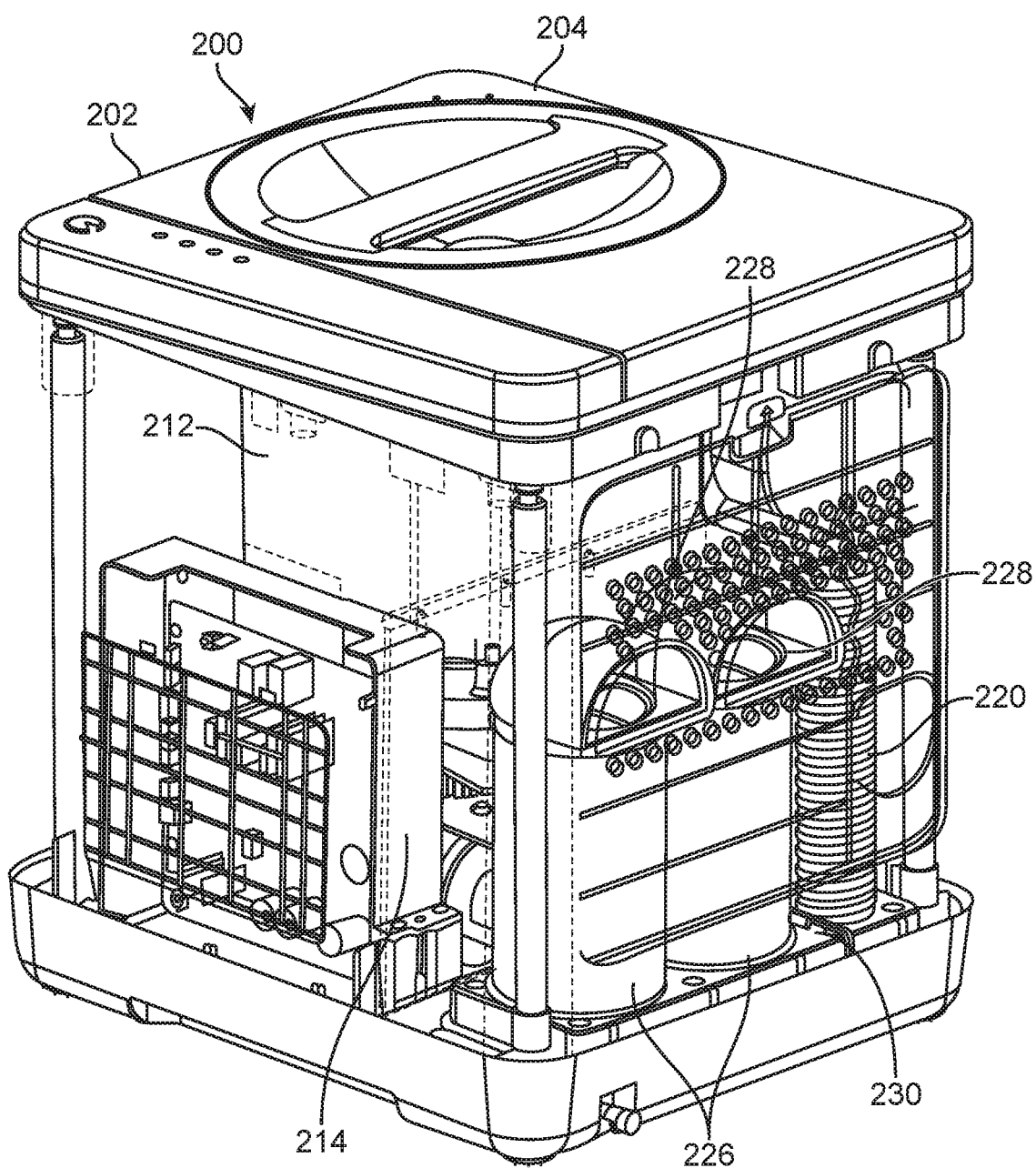
Figure 2C:
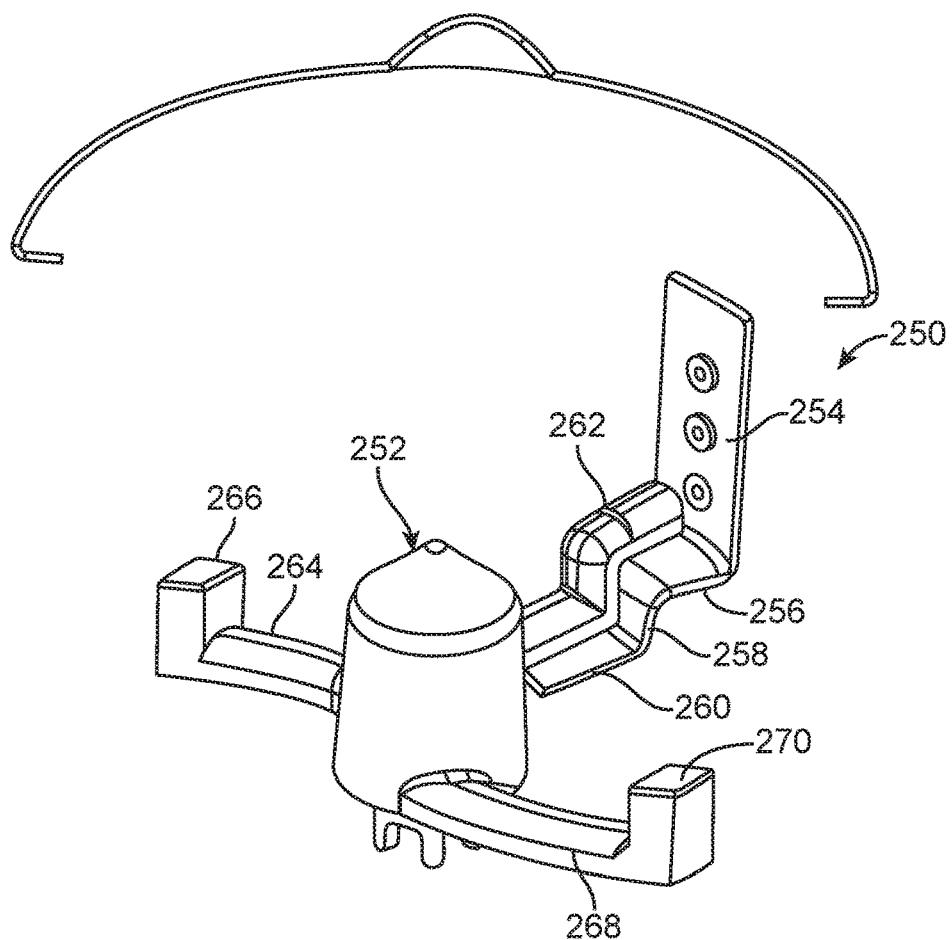
FIGS. 2C and 2D illustrate an existing grinding unit.
Figure 2D:
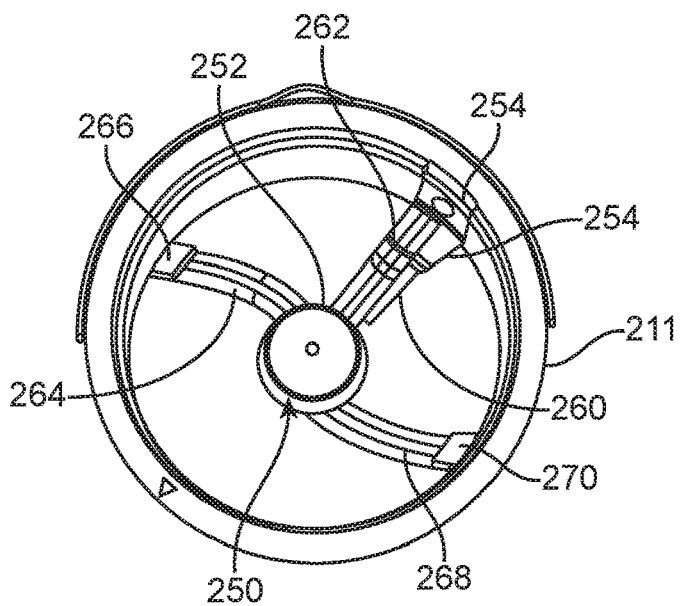

A transfer case 320 is positioned also next to the motor 318 and to the side of the bucket container 308. The transfer case enables mechanical energy to be transferred from the motor 318 to the gearbox 322. The gearbox is connected to a grinding mechanism that is configured within the bucket. The grinding component can be of any configuration. For example, existing grinding components are shown in FIG. 2C with newly proposed modified grinding components shown in other figures.

A controller 324 is electrically connected to the various components so as to control the cycle of operation for drying and grinding waste food.

The volumetric size of the food recycler 300 is preferably a width of approximately 270 mm 328, a length of approximately 310 mm 326, and a height of approximately 360 mm 330. The height is an important component as the food recycler 300 is designed to be a countertop in a kitchen or some other home environment. Typically, if there are cupboards above the countertop in a kitchen, there is approximately 18 inches of space between the countertop and the covered. Accordingly, providing a countertop appliance of approximately 14 inches is preferable for enabling the user to access the bucket 306 through removing the lid 304.

In one aspect, this disclosure may refer to an approximate measurement or an approximate length. In this scenario, the measurement can be +/−10% of the given height. Thus, providing a height of a food recycler 300 of approximately 360 mm and can include a range of 324 mm-396 mm. As described above, the components within the food recycler 300 are redesigned and reconfigured such that a ratio of a first volume of a bucket 306 that receives waste food relative to the overall volume of the food recycler case is between 0.0717 and 0.2857. Further, as noted above, as a result of this redesign and reconfiguration of the components of the food recycler 300, the bucket 306 can have a capacity to receive waste food of between 2.51 liters to 10 liters, resulting in a possible volume capacity of the food recycler 300 being between 8.79 liters and 35 liters.

While the height of the food recycler 300 can be of approximately 360 mm and can include a range of 324 mm-396 mm, the approximate length and width of the food recycler 300 can vary in accordance with the volumetric capacity of the bucket 306 (e.g., 2.51 liters to 10 liters) and of the food recycler 300 (e.g., 8.79 liters to 35 liters), subject to the ratio between the volumetric capacity of the bucket 306 and the volume of the food recycler 300. This can result in each of the length and width of the food recycler 300 being within a range of 165 mm-329 mm.

Accordingly, the food recycler 300 comprises a housing that is configured with: a height between 324 mm and 396 mm, a length between 165 mm and 329 mm, and a width between 165 mm and 329 mm. Further, the food recycler 300 comprises a controller 324 that includes a set of indicators and at least one user interface (UI) component that can be used to initiate a food recycling cycle. The controller 324 can be located within a first interior side of the housing and the UI component is configured to be accessible from the exterior of the housing. The UI component can include one or more of tactile buttons, touchscreens, dials, knobs, and the like. The food recycler 300 further comprises a motor 318 that is in electrical communication with the controller 324 and is also located within the first interior side of the housing. Along with the motor 318, the food recycler 300 includes a grinding mechanism in mechanical communication with the motor 318. As noted above, the food recycler 300 includes a bucket 306 that has a volumetric capacity between 2.51 liters and 10 liters. This bucket 306 is positioned to a second interior side of the housing and opposite the first interior side where the motor 318, controller 324, and UI component are located.

The food recycler 300 further includes a filter system that accommodates one or more air filters 310. This filter system can be positioned above the motor 318 and near the top portion of the first interior side of the housing, as illustrated in FIG. 3B, for example. In one aspect, the one or more air filters 310 are removable from the housing and can be replaced. The food recycler 300 also includes a drying component to remove water from waste food items that are inserted into the bucket 306. The food recycler 300 can further include a fan that is in electrical communication with the controller 324 to draw air from the bucket 306 and through the filter system, resulting in odorless air.

In one aspect, the controller 324 determines, based on the amount of water of the various waste food items inserted into the bucket 306, the duration of a food recycling cycle for converting the waste food items into fertilizer or other compost. This food recycling cycle can consume approximately 0.1 kilowatt hours per 100 grams of waste food items inserted into the bucket 306. To heat the waste food items as part of the food recycling cycle, the food recycler 300 can include an RF component that is in electrical communication with the controller 324. This RF component can transmit microwaves into the bucket 306 to heat the waste food items.

In another aspect, the food recycler 300 includes an antenna that is in electrical communication with the controller 324. This antenna is configured to allow wireless communication between the controller 324 and other devices over a communications network. For instance, a user of a mobile device can, via an application installed on the mobile device, transmit commands to the controller 324 to cause the food recycler 300 to perform one or more operations.

As shown in FIGS. 3A and 3B, the air filters 310 are configured in the upper portion of the internal volume of the food recycler 300. The motor 318 is positioned in the lower portion of the food recycler 300 with at least a portion of the motor overlapping the bucket container 308.

In one aspect, the user could download an app on a mobile device 350 or a desktop device that can be used to control the food recycler 300. The controller 324 can include an antenna or a controlled connection with an antenna configured within the food recycler 300 such that the user device 350 can communicate with the device 300 wirelessly. Any wireless protocol such as WiFi, cellular, Bluetooth, near Field communication, and so forth, are contemplated as being potential to medication protocols between a device 350 and the food recycler 300. In this regard, the user could remotely, either within the same building or from any location outside the building, either initiate a cycle, receive status reports on the progress of the cycle, receive error reports, and so forth through communication with the food recycler 300.

For example, in one aspect, the food recycler 300 could include in the lid 304 or some other location within the food recycler 300, a light and a camera (not shown) which can enable the user to view the contents of the bucket 306. Images or video to be received by the camera and transmitted as instructed by the controller 324 to a network node such that the user could retrieve those images through an app or through a website to visually see the progress of the cycle and the state of the waste food in the recycle process.

Figure 3C:
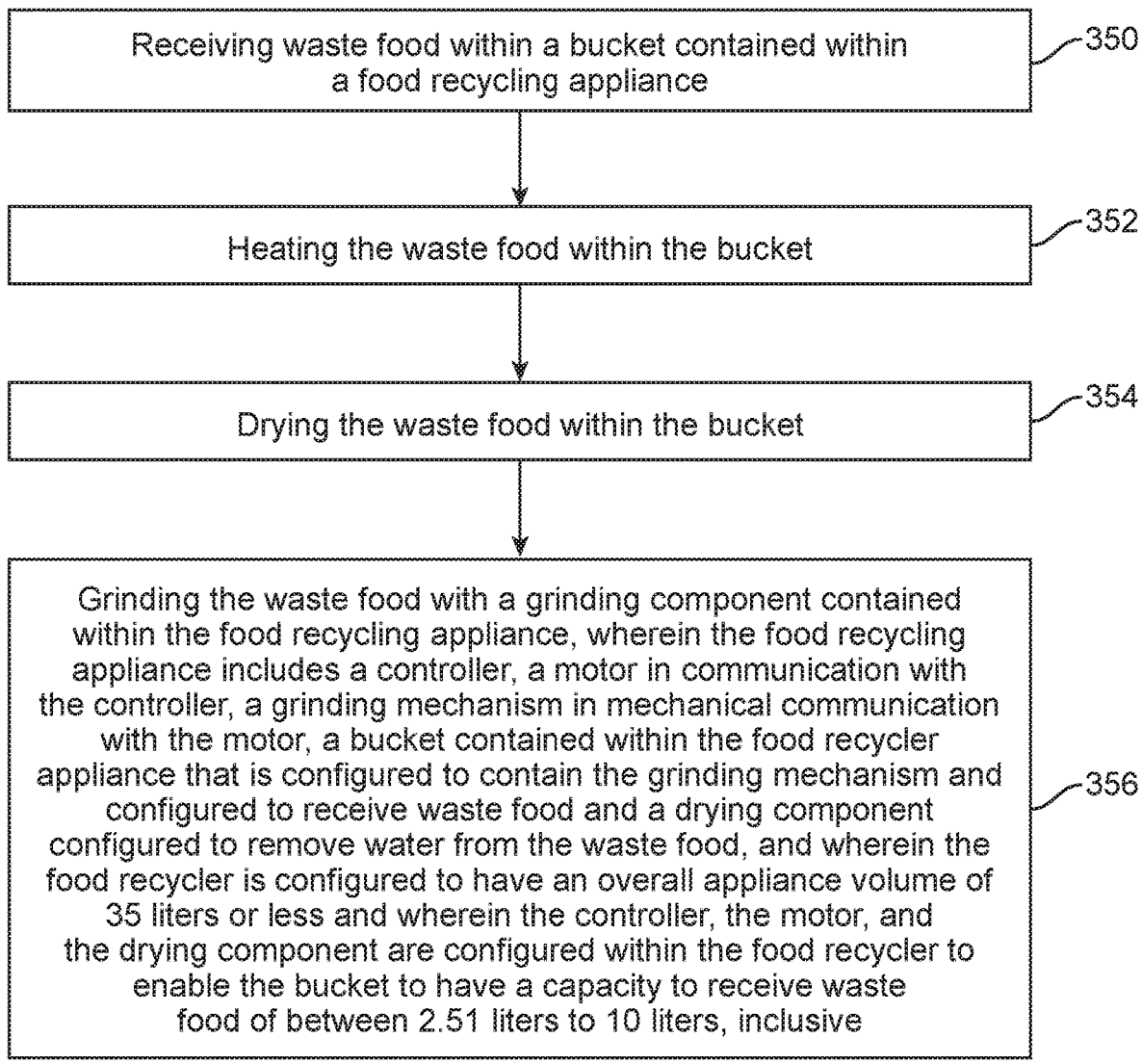
FIG. 3C illustrates an example method.

FIG. 3C illustrates a method example of processing waste food. The method includes receiving waste food within a bucket contained within a food recycling appliance (350), heating the waste food within the bucket (352), drying the waste food within the bucket (354), and grinding the waste food with a grinding component contained within the food recycling appliance, wherein the food recycling appliance includes a controller, a motor in communication with the controller, a grinding mechanism in mechanical communication with the motor, a bucket contained within the food recycler appliance that is configured to contain the grinding mechanism and configured to receive waste food and a drying component configured to remove water from the waste food, and wherein the food recycler is configured to have an overall appliance volume of 35 liters or less and wherein the controller, the motor, and the drying component are configured within the food recycler to enable the bucket to have a capacity to receive waste food of between 2.51 liters to 10 liters, inclusive (356). The volume of the bucket can be between 2.51 liters or 10 liters, in size.

Figure 4A:
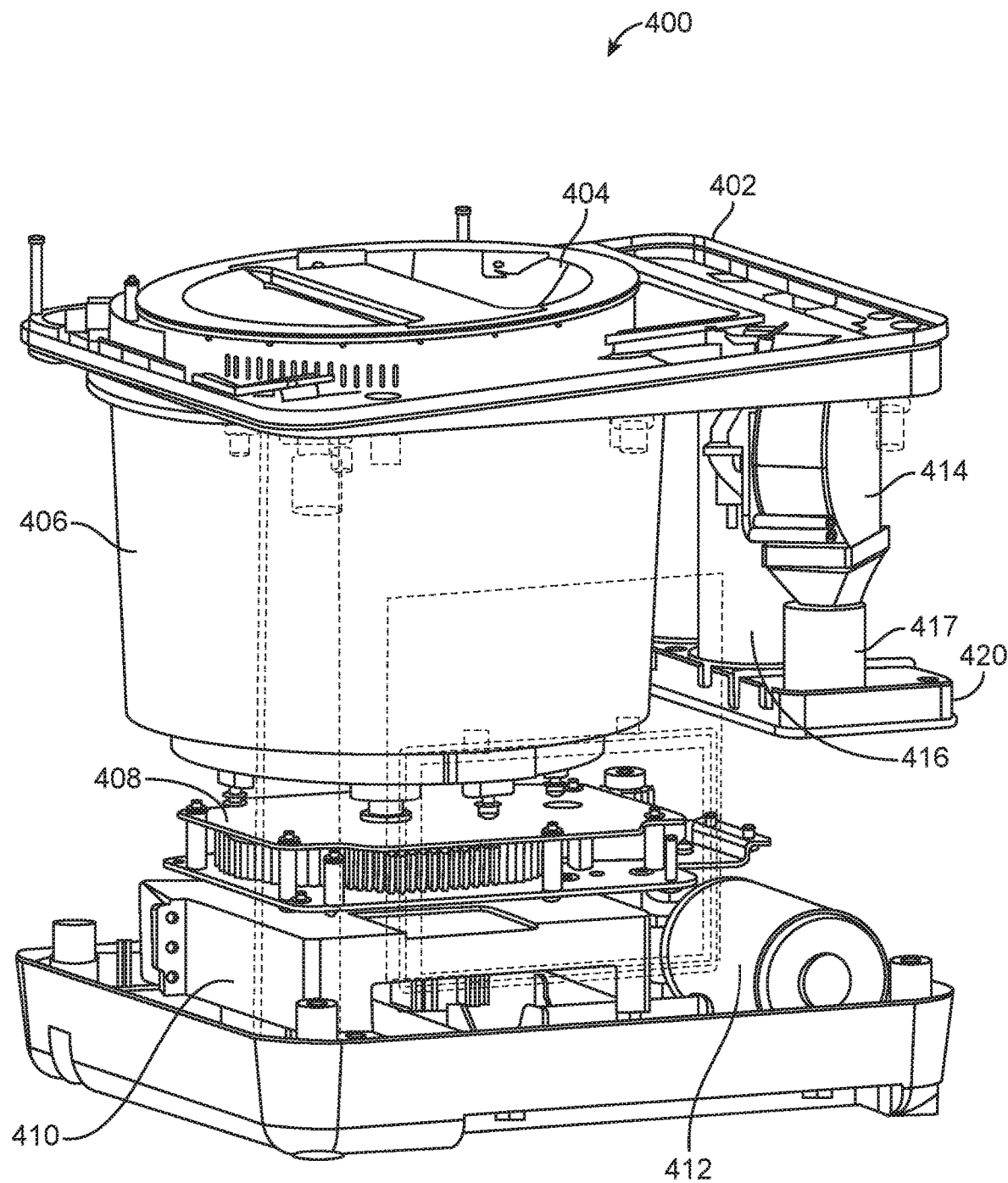
FIGS. 4A and 4B illustrate a second example of a food recycler.
Figure 4B:
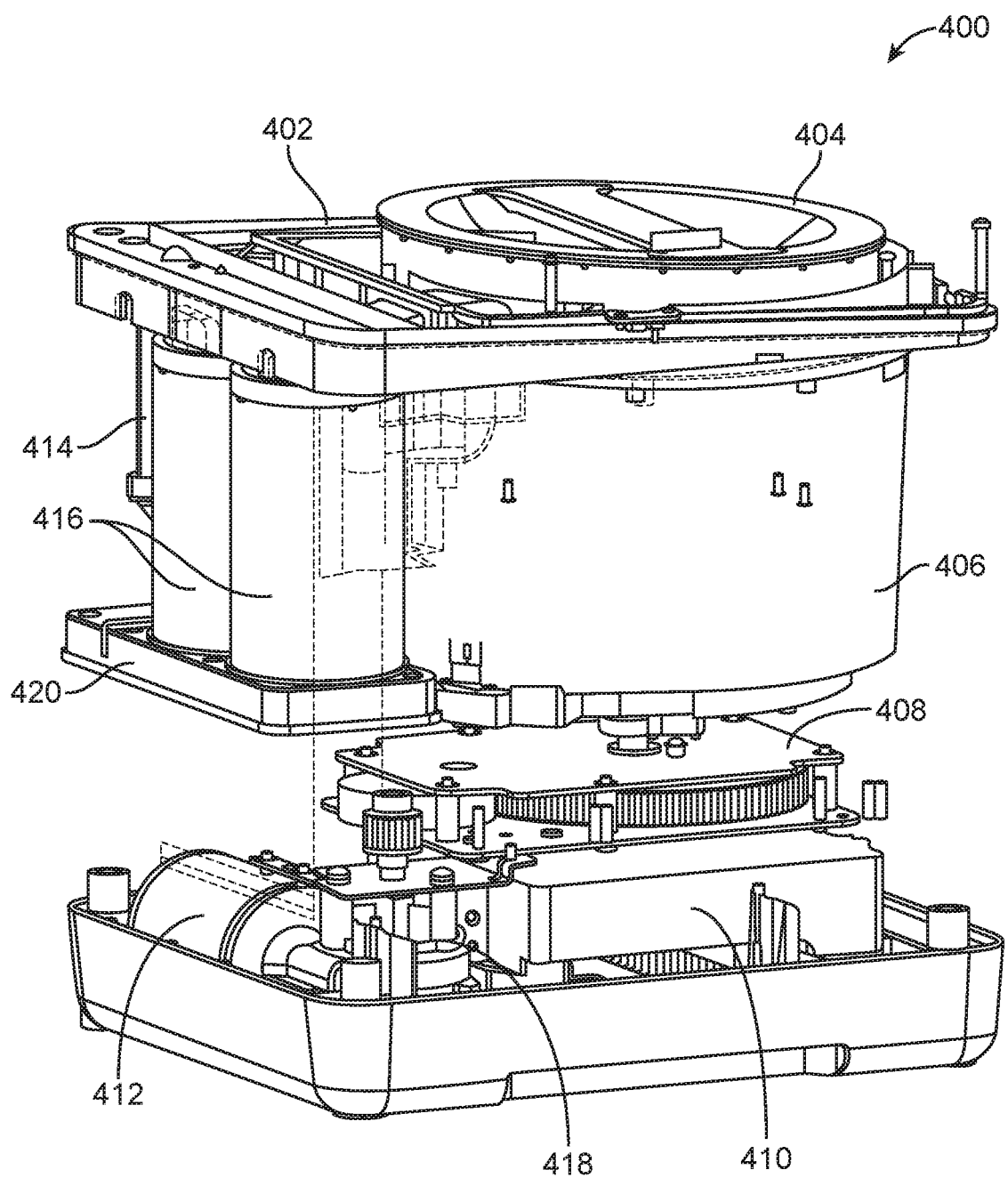

FIGS. 4A and 4B illustrate other example configurations for a food recycler 400. FIG. 4A shows a food recycler 400 having a lid 404 and a supporting structure 402 for a cover (not shown) of the food recycler 400. This configuration seeks to improve the volumetric efficiency in the XY direction for the bucket contained within the bucket container 406. In this example, one or more of the fan 414 and air filters 416, air duct 417 and second air duct 420 can be part of the drying component and are positioned near the top of the unit. The motor 412 is positioned below the bucket and along a side, and even approaching a corner of the unit. The transfer case 422 is also positioned below the bucket and adjacent to the motor 412. The controller 410 is also configured below the bucket as well as the gearbox 408. Using this configuration, the bucket diameter can increase over the diameter of the bucket in the prior art shown in FIGS. 2A and 2B.

Another aspect of this disclosure relates to an improvement in the chopping component or the grinding component relative to the current state of the art shown in FIG. 2C. There are a variety of different improved configurations that will be discussed. One of the problems with the structure shown in FIG. 2C is that it does not adequately chop or grind all of the different types of waste food that are possible. For example, bones from animal waste can be difficult to chop or grind and the configuration that is currently used is not sufficient to handled bones.

Figure 4C:
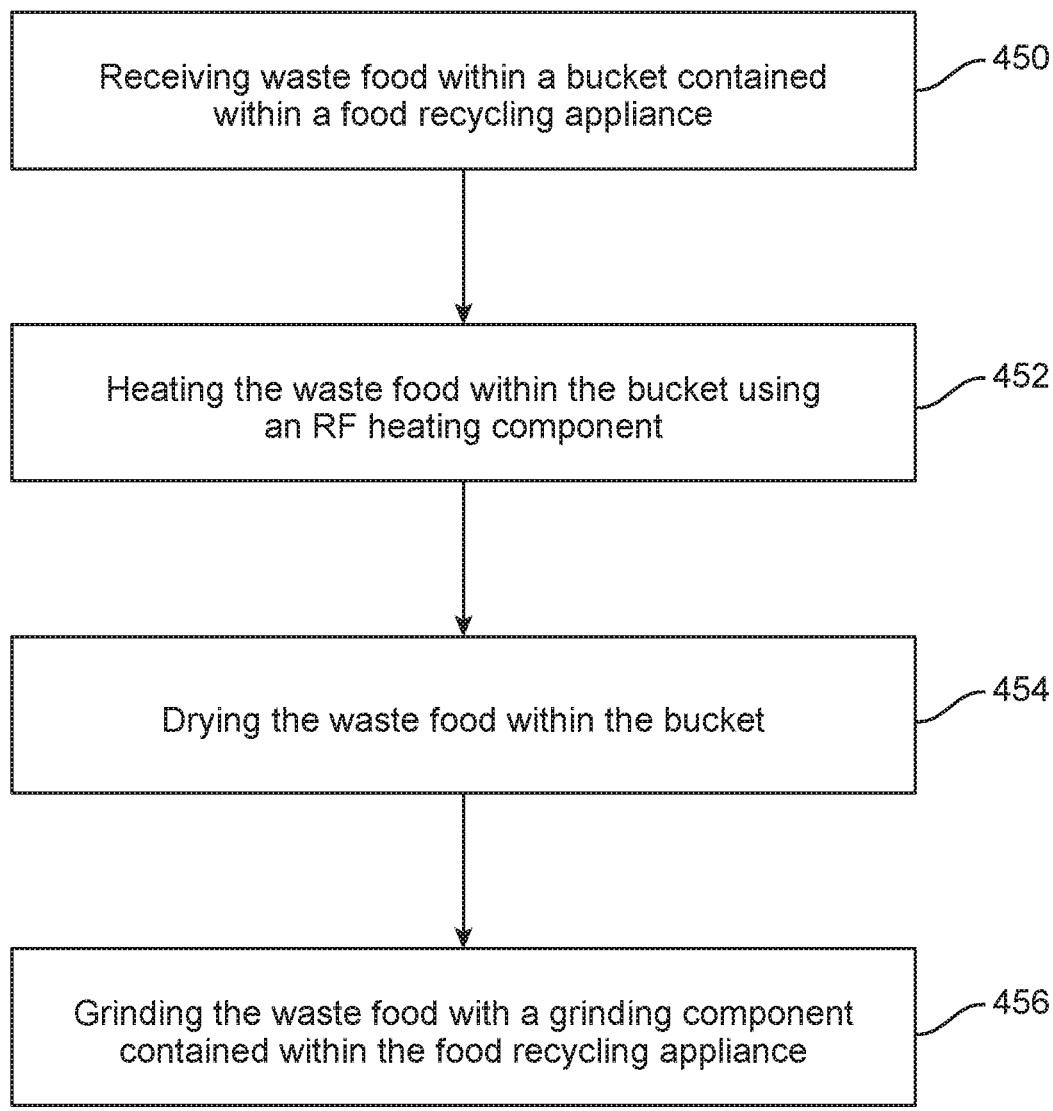
FIG. 4C illustrates an example method for operating a food recycler.

FIG. 4C illustrates an example method of operating a food recycling appliance. A food recycling method includes receiving waste food within a bucket contained within a food recycling appliance (450), heating the waste food within the bucket using an RF heating component (452), drying the waste food within the bucket (454) and grinding the waste food with a grinding component contained within the food recycling appliance (456).

Figure 5A:
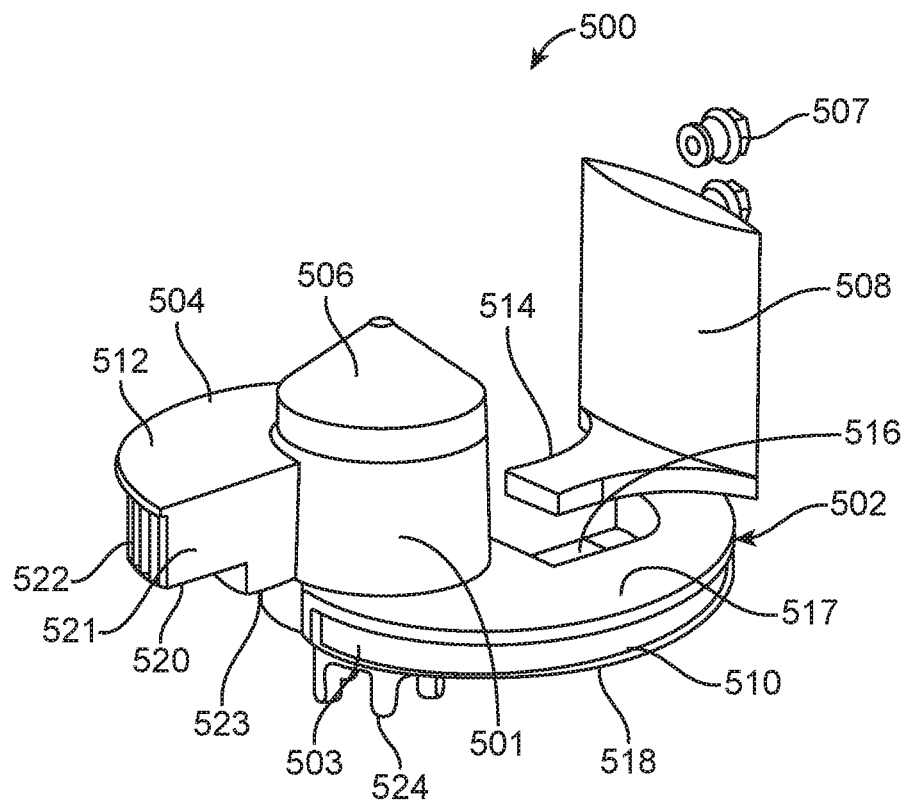
FIGS. 5A-5E illustrates an example grinding component.

FIGS. 5A-5E illustrate the improved configuration. With reference to FIG. 5A, a chopping component or grinding component 500 is disclosed. The component includes a primary column 501 that is mechanically attached to the motor system 524 of the food recycler. The controller described herein provides instructions to the motor for rotating the primary column 501 and a first direction as part of a cycle and then in a second direction as part of the food recycling cycle. A first arm 518 extends from the primary column 501. A first end of the first arm can be characterized as the end that attaches to the primary column 501. A first vertical surface 503 is shown as being part of or near the first end of the first arm 518. A second vertical surface 502 is shown at a distal end of the first arm 518. The overall curved vertical surface 510 extends along the entire length of the first arm 518. A top surface 517 can be flat such that the first arm 518 travels below a fixed chopping projection 514 which is connected to a supporting structure 508 that is attached 507 to a wall of a bucket 530 (See FIG. 5B). The first arm 518 extends at a certain elevation such that it travels below the fixed chopping projection 514.

The first arm 518 includes a blade 516 that is configured to extend from the top surface 517 of the first arm and in a direction opposite the curve surface 510. The blade 516 can be straight or curved and is configured to be complementary to a portion of the chopping projection 514 such that food can be chopped by the action of the first arm 518 rotating in a counterclockwise direction and moving beneath the chopping projection 514.

A second arm 504 extends at a higher elevation, relative to the certain elevation associated with the first arm 518 from the primary column 501. The second arm 504 has a flattop surface 512 and a curved vertical surface 511 and a flat vertical surface 521. The second arm 504 includes a first curved vertical surface configured near the primary column 501 where the second arm 504 attaches to the primary column 501. At a distal end, there is a second curved vertical surface that, in one aspect, can include teeth 522 or another configured surface that can be used to grip or grind waste food. The second arm 504 can have a first component 520 and a second component 523 that are configured such that the first component 520 travels over the chopping projection 514 as the component 500 rotates as part of a food recycling cycle. The second component 523 can be configured to travel adjacent to the chopping projection 514 as the component rotates.

Figure 5B:
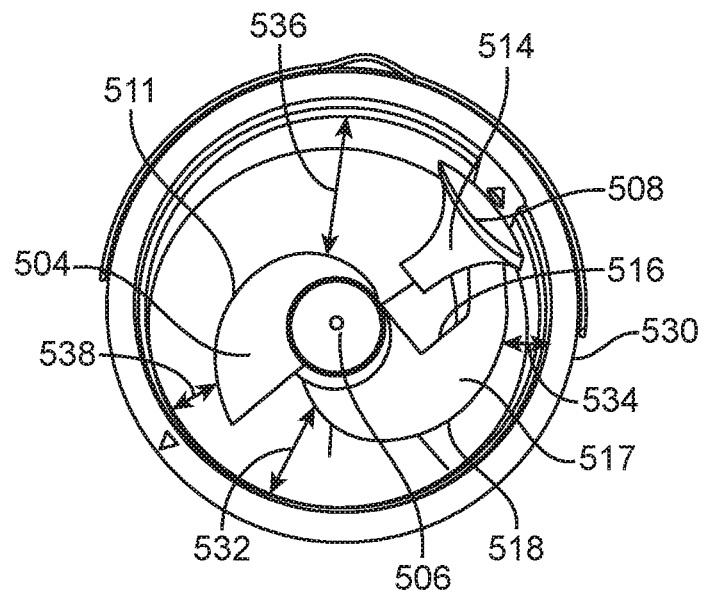

FIG. 5B shows a top view of the grinding component 500. The first arm has a first distance 532 configured between a first end of the first arm 518 and a wall of the bucket 530. The curved nature of the first arm 518 results in the distance 532 being greater than a second distance 534 which is identified as the distance between a second end or a second portion of the first arm 518 that is distal to the first end. In this regard, as the grinding component 500 rotates in the clockwise direction, waste food can be compressed inasmuch as the relative distance between a vertical edge 510 (shown in FIG. 5A) of the first arm 518 and the wall of the bucket become shorter as the first arm 518 rotates. Thus, food can be compressed against the wall of the bucket in an improved manner over the prior grinding component.

Similarly, the second arm 504 includes a curved vertical surface 511 such that a first distance 536 between the wall of the bucket and a first end of the second curved arm 504 is greater than a second distance 538 between a distal vertical surface of the second curved arm 504 and the wall of the bucket. Again, food can be compressed between the curve surface 511 and the wall of the bucket as the grinding component 500 rotates in a clockwise direction.

A top surface 506 of the primary column can have a sloped surface as shown in the figures such that waste food does not remain or settle on top of the primary column 501 or can have other configurations.

A shape of the chopping projection 514 can include a flat upper surface and a flat lower surface and a first curved vertical edge with a second curved vertical edge each meeting at a distal end with a flat vertical edge as shown in the figures. Other configurations are contemplated as well.

Generally speaking, the configuration of the chopping projection 514 is complementary to the first arm 518 and the second arm 504.

Figure 5C:
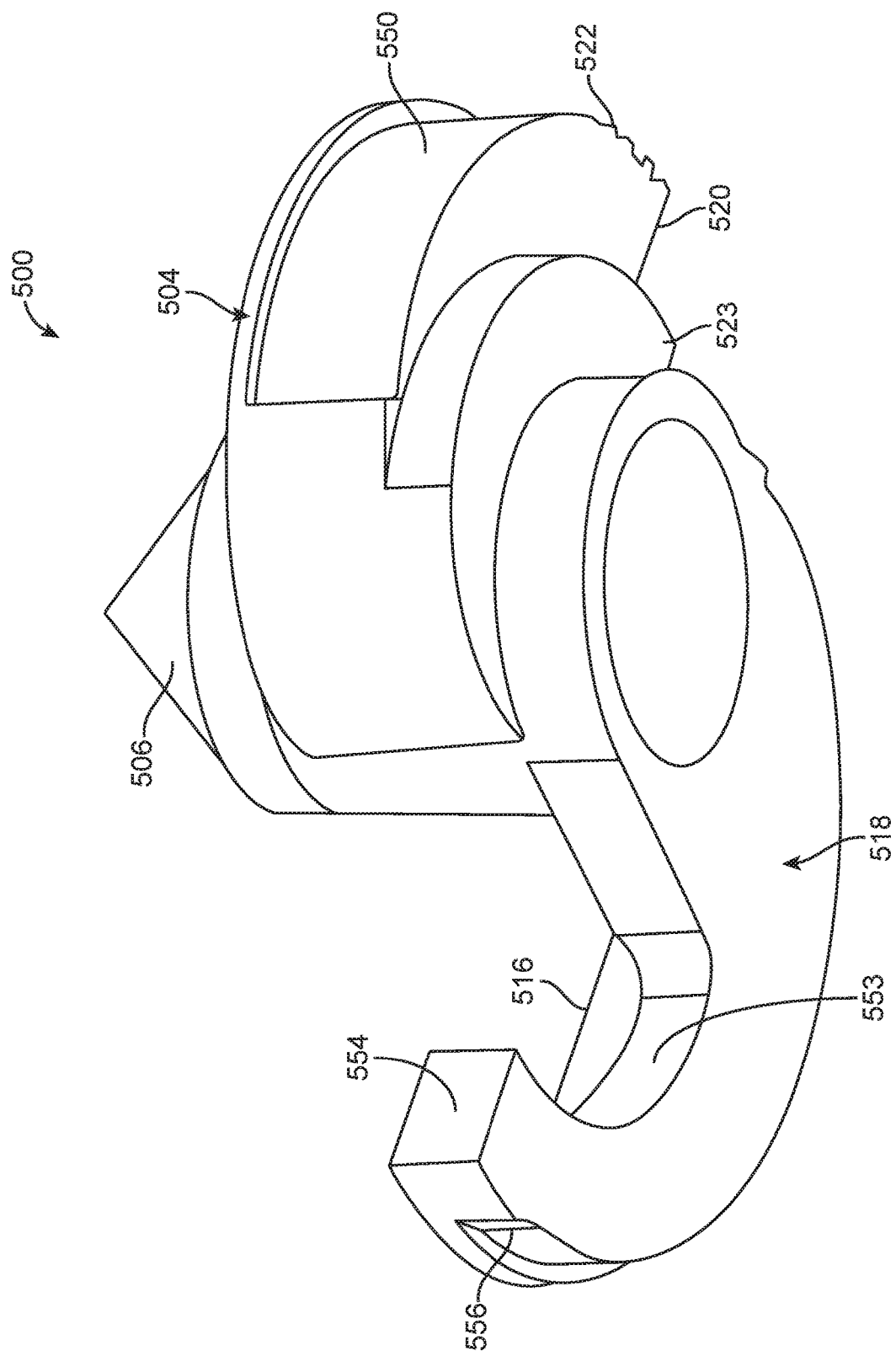

FIG. 5C illustrates a view from below the grinding component 500. The first component 520 and the second from component 523 of the second arm 504 are shown in more detail. The teeth 522 are shown as part of the distal end of the second arm 504. The exterior vertical surface 550 of the second arm is also shown. Feature 556 shows the vertical surface of the distal end of the first arm 518. In this figure, a slight variation on the configuration of the curved surfaces 550 and 556 are shown. In one aspect, the surfaces may be flat or may have a portion of the vertical surface extending further than another portion of the vertical surface as shown in FIG. 5C. These services may also include additional grinding teeth similar to the teeth 522 shown distributed in various positions along the surface. For example, teeth 522 may be configured along the entire vertical surface or in portions of the vertical surface for strategic grinding capabilities.

FIG. 5C also shows the blade 516 which can be beneficial for cutting high fiber food waste. The blade 516 is generally configured as an extension of the top surface of the first arm 518. A vertical surface 553 is also shown as part of the curved first arm 518. The blade 516 can be an extension of this surface and could be considered also as a further extension of the top surface 517 (Shown in FIG. 5A) of the first arm 518.

Figure 5D:
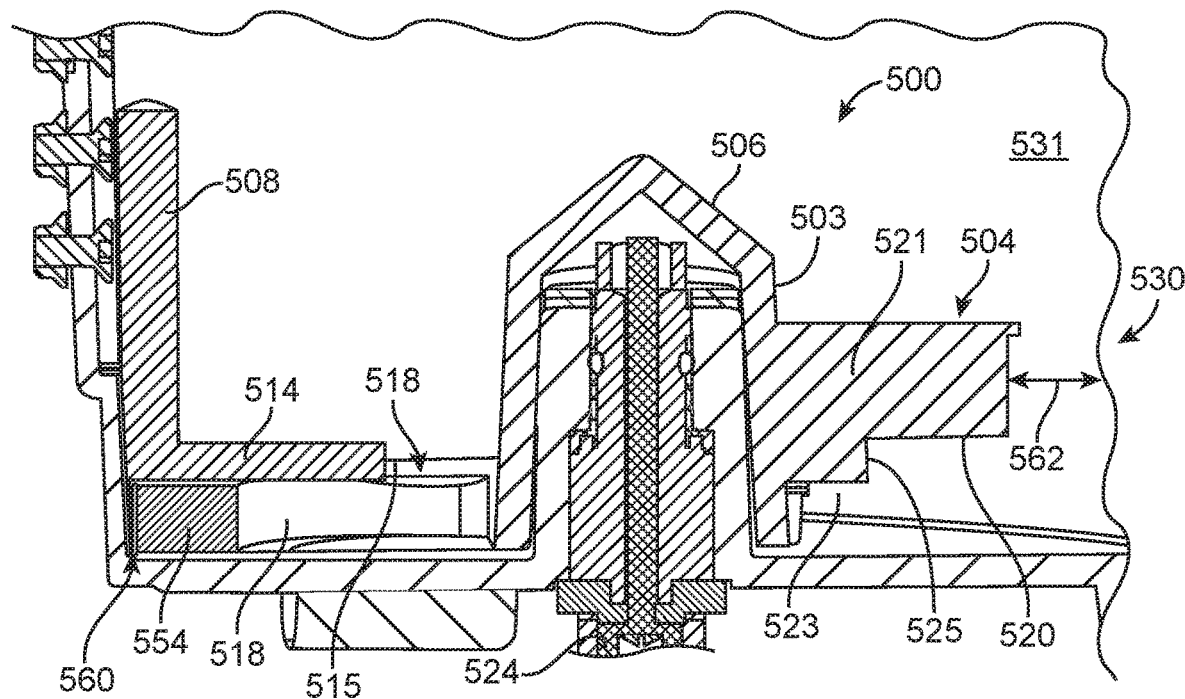

FIG. 5D illustrates another view of the grinding component 500. Shown are some example structures for mechanically attaching 524 the grinding component 500 to a motor system. The chopping projection 514 is shown with its supporting mechanism 508. Some example distances between arm components and the interior wall 531 of the bucket 530 are shown. For example, a distance 560 between the vertical surface of the distal and of the first arm 518 can be approximately 1 mm. A distance 562 between the distal end of the second arm 504 and the wall 530 can be approximately 15 mm. These are example distances and a range of distances may be employed.

Figure 5E:
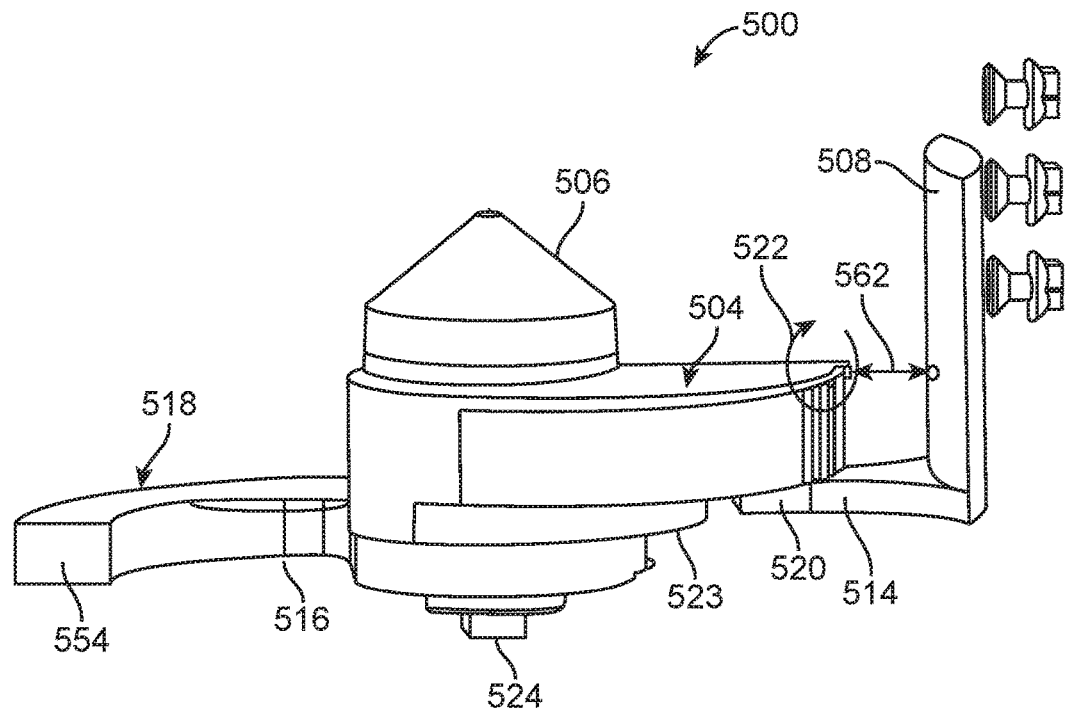

FIG. 5E illustrates yet another view of the grinding component 500 with the various features shown including an end vertical surface 554 of the first arm 518. The distance 562 between the distal end of the second arm 504 and the wall of the bucket is shown as well. This figure also shows the relative positions of the second arm 504 with its first component 520 positioned above the chopping projection 514 upon rotation. The second component 523 is shown as being adjacent to the distal end of the chopping projection 514.

Figure 6A:
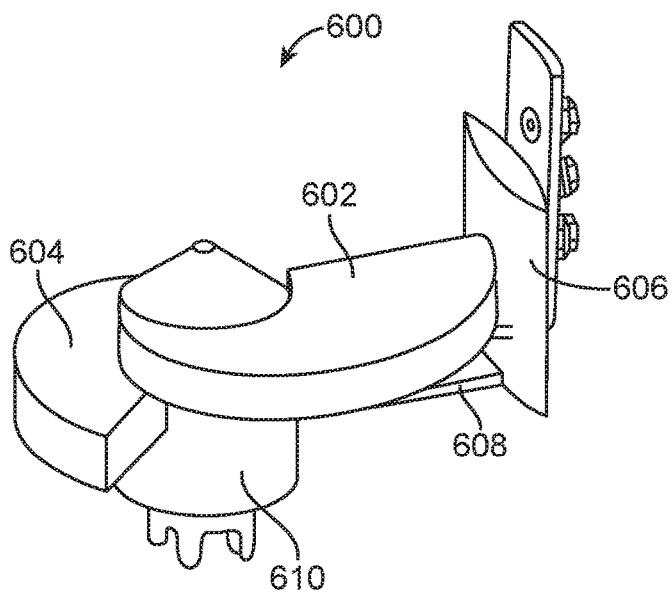
FIGS. 6A-6C illustrate example alternate grinding component configurations.

The particular configurations of the arms extending from the primary column can also vary in several respects. For example, FIG. 6A illustrates a different configuration 600 in which the upper arm 602 extends further towards the wall of the bucket than the lower arm 604. The chopping projection 608 in this configuration is shown as being beneath the upper arm 602. Note the partial overlap between the upper arm 602 and the lower arm 604. A supporting structure 606 for the chopping projection 608 is shown as well. A primary column 610 is used to attach the arms.

Figure 6B:
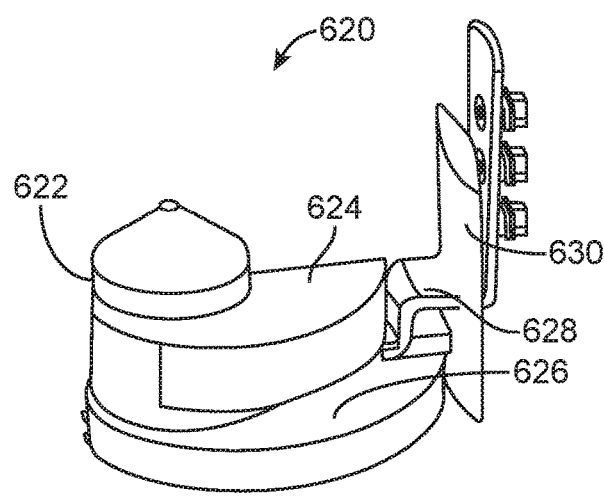

FIG. 6B illustrates another alternate example 620 in which an upper arm 624 is configured to have a substantial amount of overlap with a lower arm 626. The chopping projection 628 is configured such that upon rotation a portion of the upper arm 624 passes above a portion of the chopping projection 628 while simultaneously a portion of the lower arm 626 passes below the chopping projection 628. A supporting structure 630 enables the chopping projection 628 to be configured in the wall of the bucket. A primary column 622 is used to attach the arms.

Figure 6C:
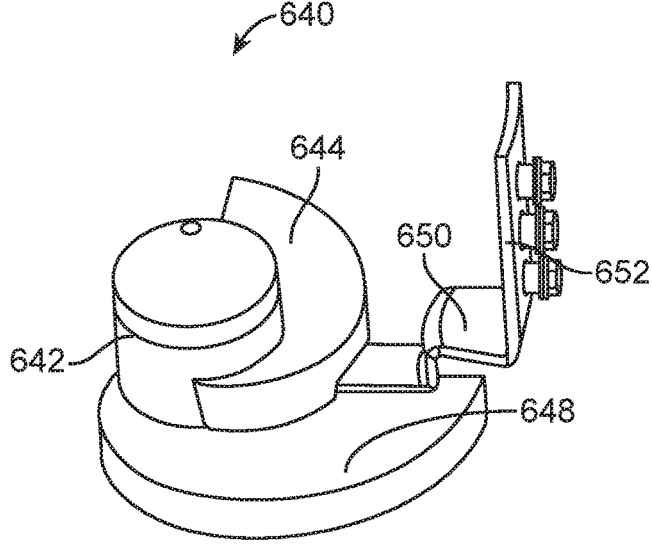

FIG. 6C illustrates yet another example 640 which shows a first upper arm 644 partially overlapping a lower extending arm 648. A chopping projection 650 is shown with a horizontal portion that first extends from the supporting structure 652, a second portion that is vertical and the last distal portion that again is horizontal. The lower arm 648 is configured to rotate below the entire chopping projection 650 and the upper arm 644 is configured to rotate adjacent to an above the distal horizontal portion of the chopping projection 650.

Figure 7A:
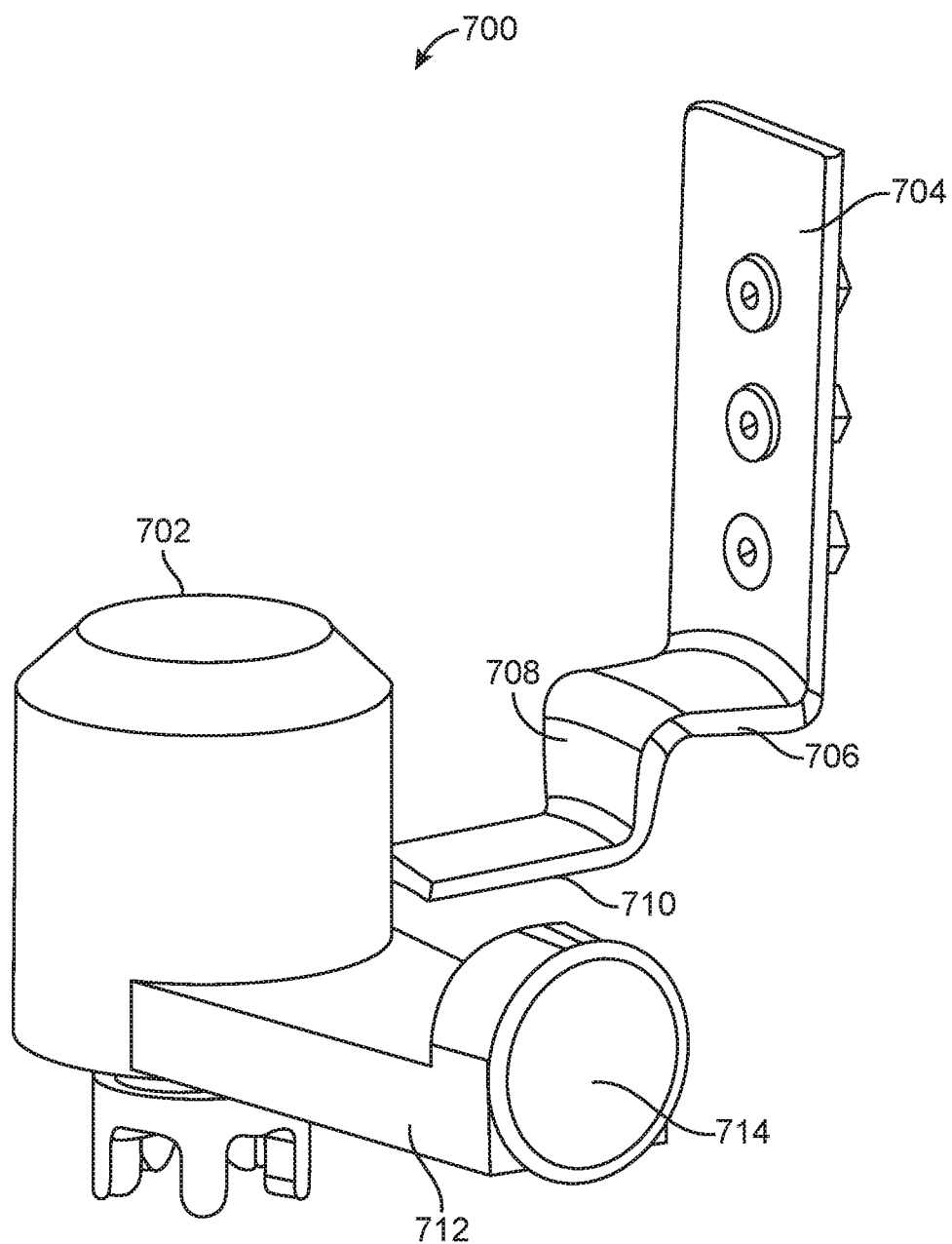
FIGS. 7A-7B illustrate alternate grinding component configurations.

FIG. 7A illustrates yet another example configuration of a grinding mechanism 700 which includes a chopping projection supporting structure 704 from which a first horizontal segment projects 706 which connects to a vertical portion 708 and a final horizontal distal projection 710. A primary column 702 includes an extension arm 712 which includes a vertical cutting wheel 714. The configuration of the arm 712 is such that a first portion of the arm is configured to be complementary to and rotate below the distal horizontal projection 710 of the chopping projection. A distal end of the arm 712 is configured to hold the vertical cutting wheel 714 and also to travel under the first portion of the chopping projection 706 upon rotation of the grinding component 700. While the arm 712 is shown generally to be straight in FIG. 7A, the configuration could also be curved as well in a similar nature to the other structures disclosed herein.

Figure 7B:
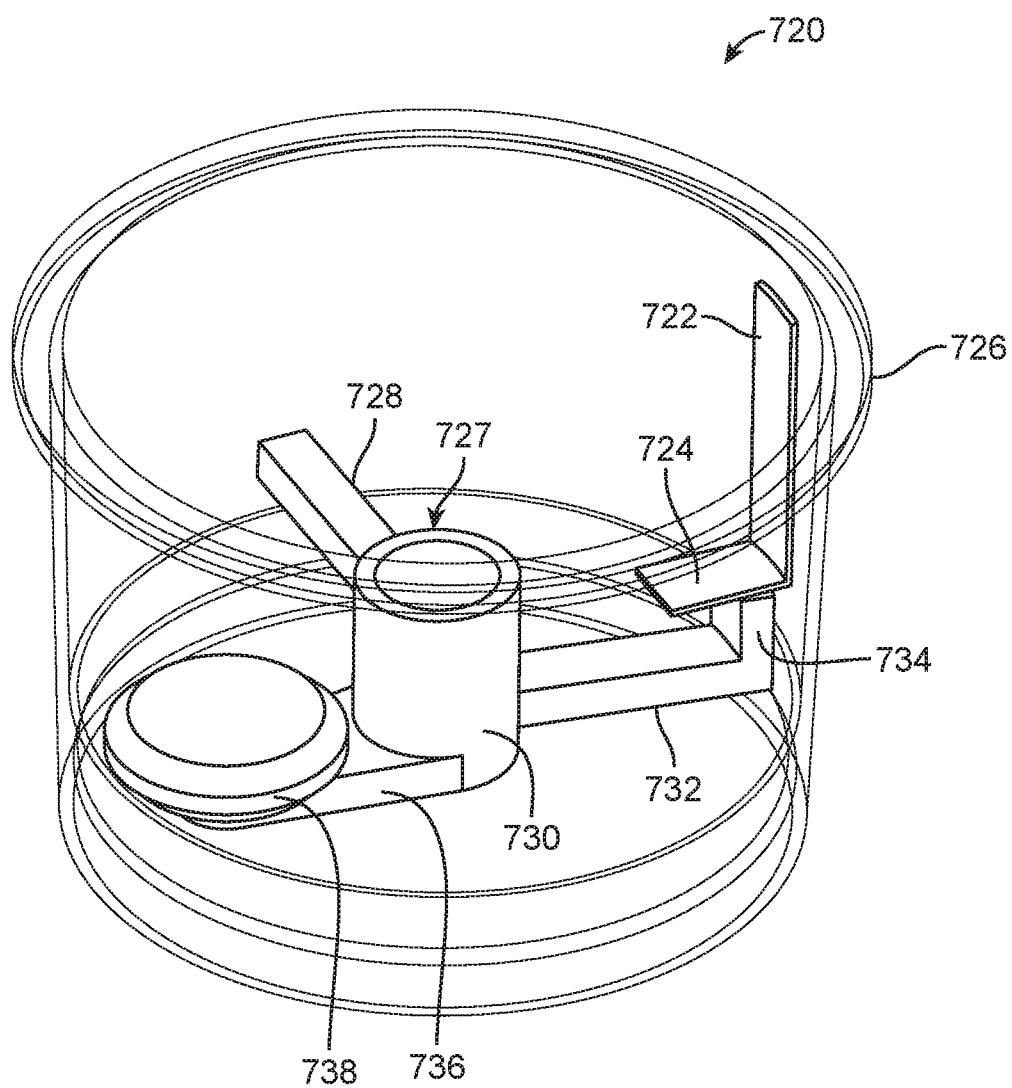

FIG. 7B illustrates another example structure 720 in which a grinding mechanism 727 includes a chopping component supporting structure 722 that provide support for an example chopping projection 724. A primary column 730 supports a first leg 728 which is a straight projection from the column 730. A second leg 732 projects from the column 730 and includes a distal end 734 which has a vertical projection which is complementary to a lower surface of the chopping projection 724. A third leg 736 extends from the lower portion of the column 730 and includes a horizontal cutting wheel 738. In this example, the horizontal cutting wheel 738 is configured to travel below the chopping projection 724 upon rotation of the grinding component 720. A bucket 726 is shown as supporting the chopping projection 724 and supporting structure 722. The arm 728 is configured to pass above the chopping projection 724 in this example.

Figure 8:
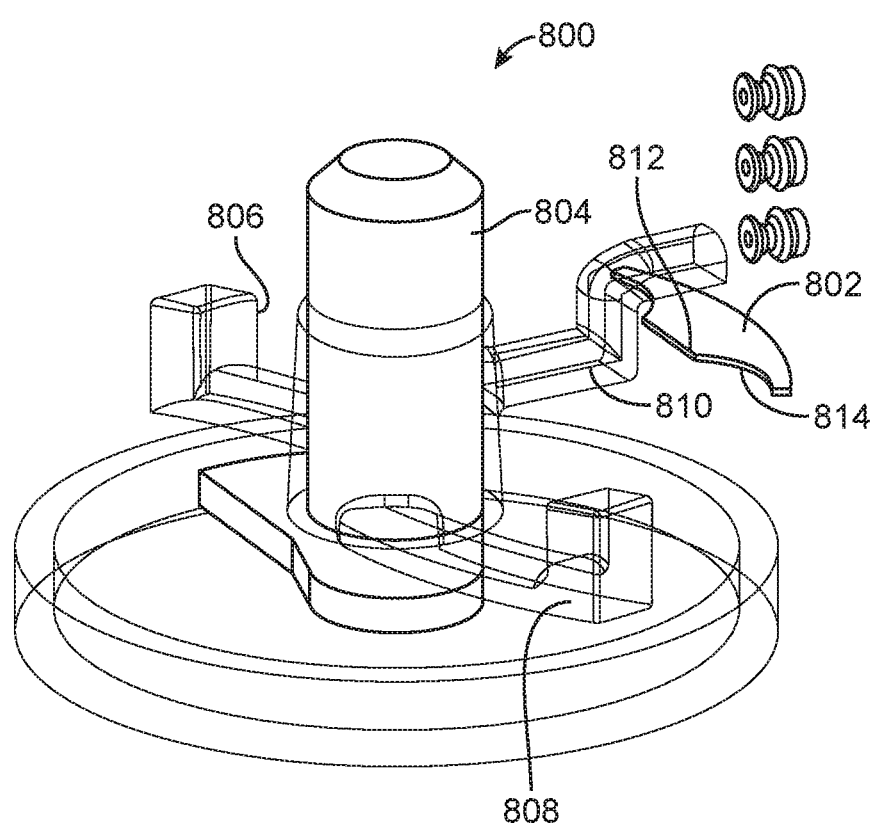
FIG. 8 illustrates a stopper configuration.

FIG. 8 illustrates another variation of a grinding mechanism 800 in which the traditional arms 806, 808 and 810 can be used as projecting from a primary column 804 but that a modified stopper 802 is provided. In this scenario, the distal end of the arm 810 travels above the stopper 802 while the distal end of leg 806 and the distal end of leg 808 each travel underneath the stopper 802. The modified stopper has a first curve surface 814 on a first side of the stopper 802 as well as a second corresponding and similar curve surface (not numbered) on an opposite side of the stopper 802. A distal end of the stopper 812 can have a curved or straight surface. The services described herein can, in one example, be sharpened such that as waste food is brought into contact with the stopper 802 it can be cut via the movement of one or more of the arms 806, 808, 810 against the stopper 802. It is also noted that while the traditional arms are included in FIG. 8, any of the arm structures disclosed herein could be applied to this example. This is a general principle as well that any of the stopper or chopper projection structures could be combined with any of the leg configurations disclosed herein.

Figure 9:
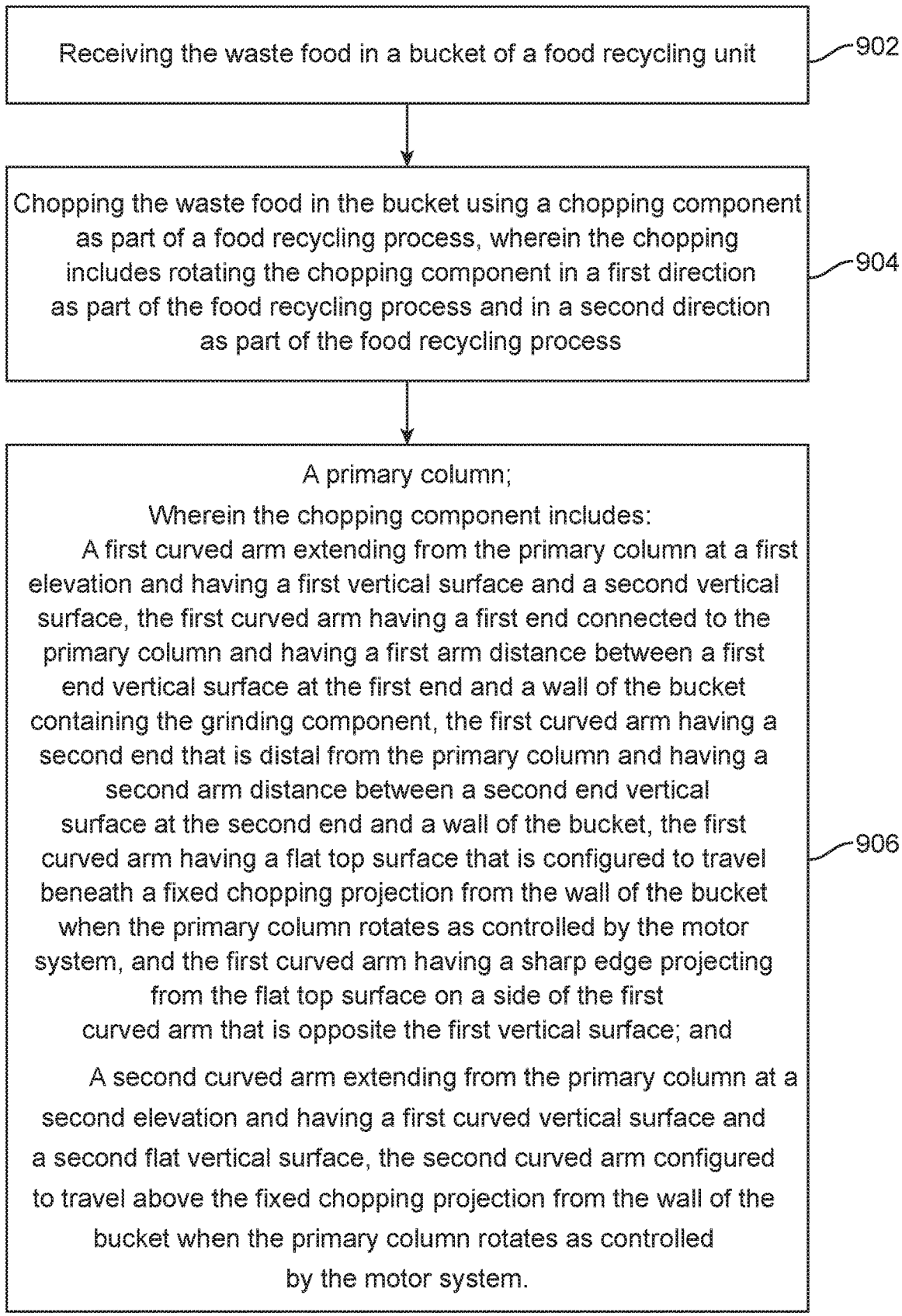
FIG. 9 illustrates an example method related to using a grinding component.

FIG. 9 illustrates an example method of using a chopping or grinding component for processing waste food. The method includes receiving the waste food in a bucket of a food recycling unit (902) and chopping the waste food in the bucket using a chopping component as part of a food recycling process, wherein the chopping includes rotating the chopping component in a first direction as part of the food recycling process and in a second direction as part of the food recycling process (904).

The chopping component, by way of example, includes one or more of: (1) a primary column, (2) a first curved arm extending from the primary column at a first elevation and having a first vertical surface and a second vertical surface, the first curved arm having a first end connected to the primary column and having a first arm distance between a first end vertical surface at the first end and a wall of the bucket containing the grinding component, the first curved arm having a second end that is distal from the primary column and having a second arm distance between a second end vertical surface at the second end and a wall of the bucket, the first curved arm having a flat top surface that is configured to travel beneath a fixed chopping projection from the wall of the bucket when the primary column rotates as controlled by the motor system, and the first curved arm having a sharp edge projecting from the flat top surface on a side of the first curved arm that is opposite the first vertical surface and (3) a second curved arm extending from the primary column at a second elevation and having a first curved vertical surface and a second flat vertical surface, the second curved arm configured to travel above the fixed chopping projection from the wall of the bucket when the primary column rotates as controlled by the motor system (906).

Energy Savings

Another aspect of this disclosure relates to providing an alternate form of heat which differs from current configurations. The existing food recyclers utilize a heat plate which causes heat to be transferred to the bucket and which heats the food as part of the food recycling process. This disclosure now introduces a new approach to heating waste food as part of the recycling process. This disclosure first introduces microwaves and microwave ovens and then applies some of these principles to a new context and a new structure with respect to utilizing an RF component to at least, in part, heat waste food as part of the food recycling process.

Microwaves are a form of electromagnetic radiation with wavelengths ranging from about one meter to one millimeter; with frequencies between 300 MHz (1 m) and 300 GHz (1 mm). Different sources define different frequency ranges as microwaves; the above broad definition includes both UHF and EHF (millimeter wave) bands. A more common definition in radio engineering is the range between 1 and 100 GHz (wavelengths between 0.3 m and 3 mm). In all cases, microwaves include the entire SHF band (3 to 30 GHz, or 10 to 1 cm) at minimum. Frequencies in the microwave range are often referred to by their IEEE radar band designations: S, C, X, $K_u$, K, or $K_a$ band, or by similar NATO or EU designations.

The prefix micro- in microwave is not meant to suggest a wavelength in the micrometer range. Rather, it indicates that microwaves are "small" (having shorter wavelengths), compared to the radio waves used prior to microwave technology. The boundaries between far infrared, terahertz radiation, microwaves, and ultra-high-frequency radio waves are fairly arbitrary and are used variously between different fields of study.

A microwave oven (also commonly referred to as a microwave) is an electric oven that heats and cooks food by exposing it to electromagnetic radiation in the microwave frequency range. This induces polar molecules in the food to rotate and produce thermal energy in a process known as dielectric heating. Microwave ovens heat foods quickly and efficiently because excitation is fairly uniform in the outer 25-38 mm (1-1.5 inches) of a homogeneous, high water content food item. Food is more evenly heated throughout in comparison to what generally occurs in other cooking techniques.

The development of the cavity magnetron made possible the production of electromagnetic waves of a small enough wavelength (microwaves). Microwave ovens are a kitchen appliance and are used for reheating previously cooked foods and cooking a variety of foods. They are also useful for rapid heating of otherwise slowly prepared foodstuffs, which can easily burn or turn lumpy when cooked in conventional pans, such as hot butter, fats, chocolate or porridge. Unlike conventional ovens, microwave ovens usually do not directly brown or caramelize food, since they rarely attain the necessary temperatures to produce Maillard reactions. Exceptions occur in rare cases where the oven is used to heat frying-oil and other very oily items (such as bacon), which attain far higher temperatures than that of boiling water.

The cavity magnetron is a high-powered vacuum tube that generates microwaves using the interaction of a stream of electrons with a magnetic field while moving past a series of open metal cavities (cavity resonators). Electrons pass by the openings to these cavities and cause radio waves to oscillate within, similar to the way a whistle produces a tone when excited by an air stream blown past its opening. The frequency of the microwaves produced, the resonant frequency, is determined by the cavities' physical dimensions. Unlike other vacuum tubes such as a klystron or a traveling-wave tube (TWT), the magnetron cannot function as an amplifier in order to increase the intensity of an applied microwave signal; the magnetron serves solely as an oscillator, generating a microwave signal from direct current electricity supplied to the vacuum tube.

In microwave ovens, a waveguide leads to a radio frequency-transparent port into the cooking chamber. The fixed dimensions of the chamber and its physical closeness to the magnetron would normally create standing wave patterns in the chamber, however, the pattern is randomized by a motorized fan-like stirrer in the waveguide (more often in commercial ovens), or by a turntable that rotates the food (most common in non-commercial ovens).

FIGS. 10A-10D illustrated example of introduction of an RF component into a food recycling appliance. Microwaves have a frequency that can penetrate water, fat and sugar molecules and excite them. For molecules to be excited, the electrons orbiting the nucleus have to jump up into a higher energy level. When this occurs, the atom starts to vibrate faster than normal. When this happens in a glass of water, for example, all the atoms that make up the water start to move and run into each other and create friction. When friction is created, energy is given off in the form of heat. The generation of heat using microwave technology is part of the dehydration process in connection with food recycling. The food recycling process preferably heats the waste food as part of the process. Previously, a heat plate was deployed within the food recycling appliance that was physically connected to the bucket and, when heated, would transfer heat from the heat plate to the bucket and thereby heat the waste food. The introduction of an RF component, in whole or in part, to heat the food results in a more efficient food recycling process in comparison to just heating the food via of heat plate.

Figure 10A:
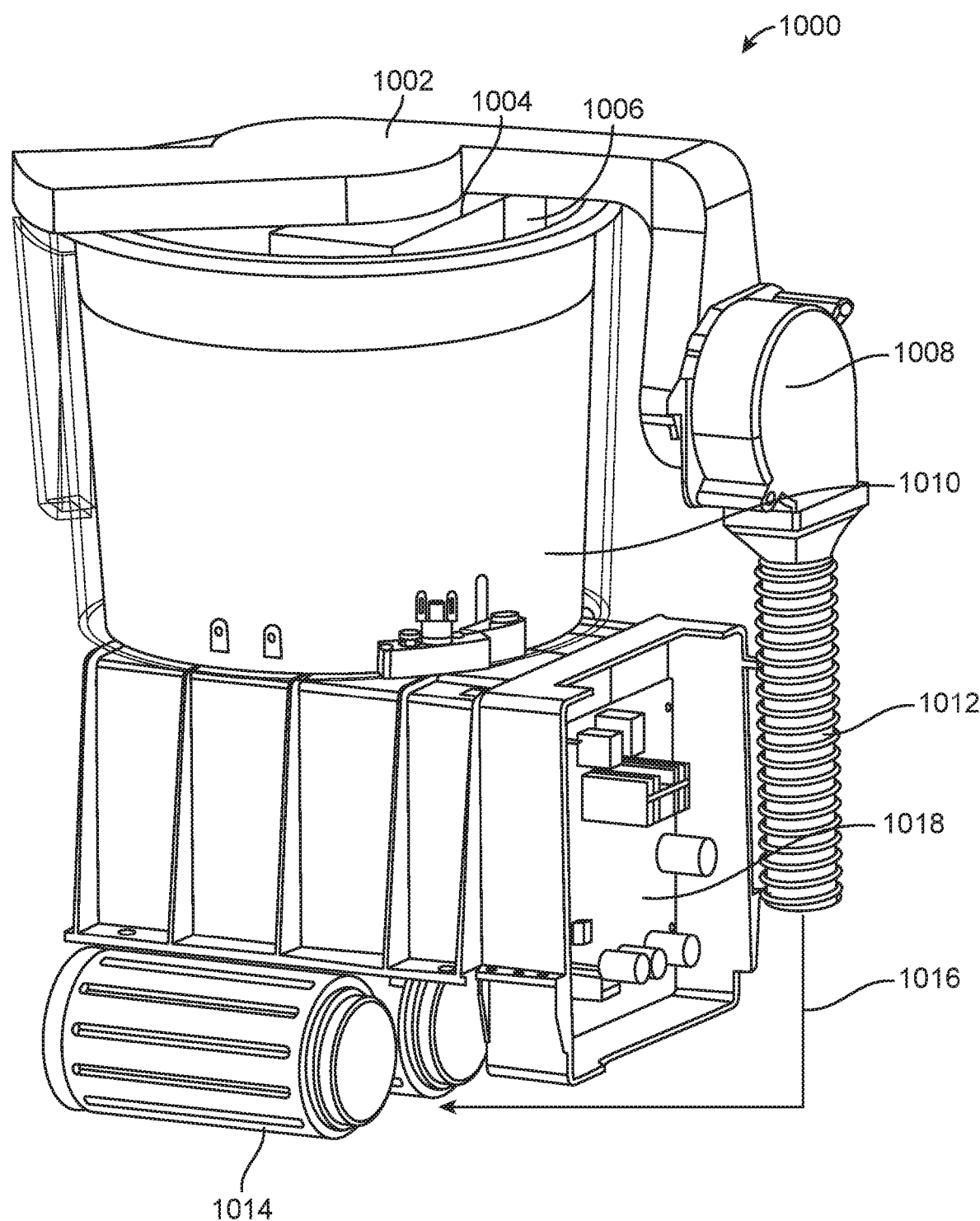
FIGS. 10A-10D illustrate an RF component example.
Figure 10B:
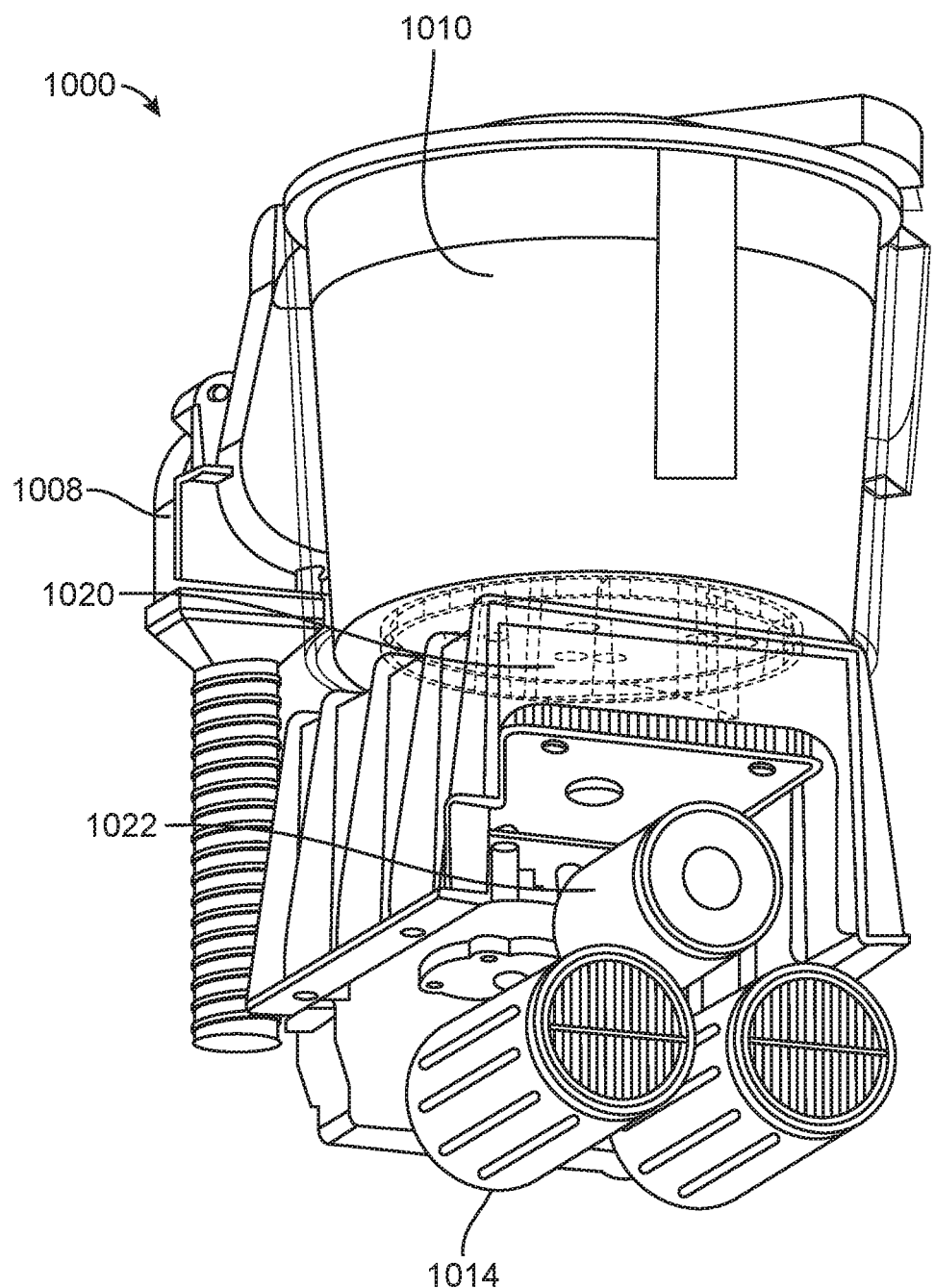

FIG. 10A illustrates a food recycler 1000 that includes an air circulation component 1002, a waveguide 1004, and RF component 1006, a fan 1008 connected to the air circulation component 1002, a control system 1018, an air guide 1012, an airflow path 1016 and the filtering system 1014. FIG. 10B further shows the food recycler system 1000 with the bucket 1010, the fan 1008, and a heated plate 1020. A grinding system 1022 is also shown which includes a motor, transfer case, and gearbox for controlling the motion of a grinding component within the bucket 1010. One or more of the fan 1008, air circulation component 1002, airflow path 1016 and/or filtering system 1014 can be a drying component used to dry the food items in the bucket 1010.

Figure 10C:
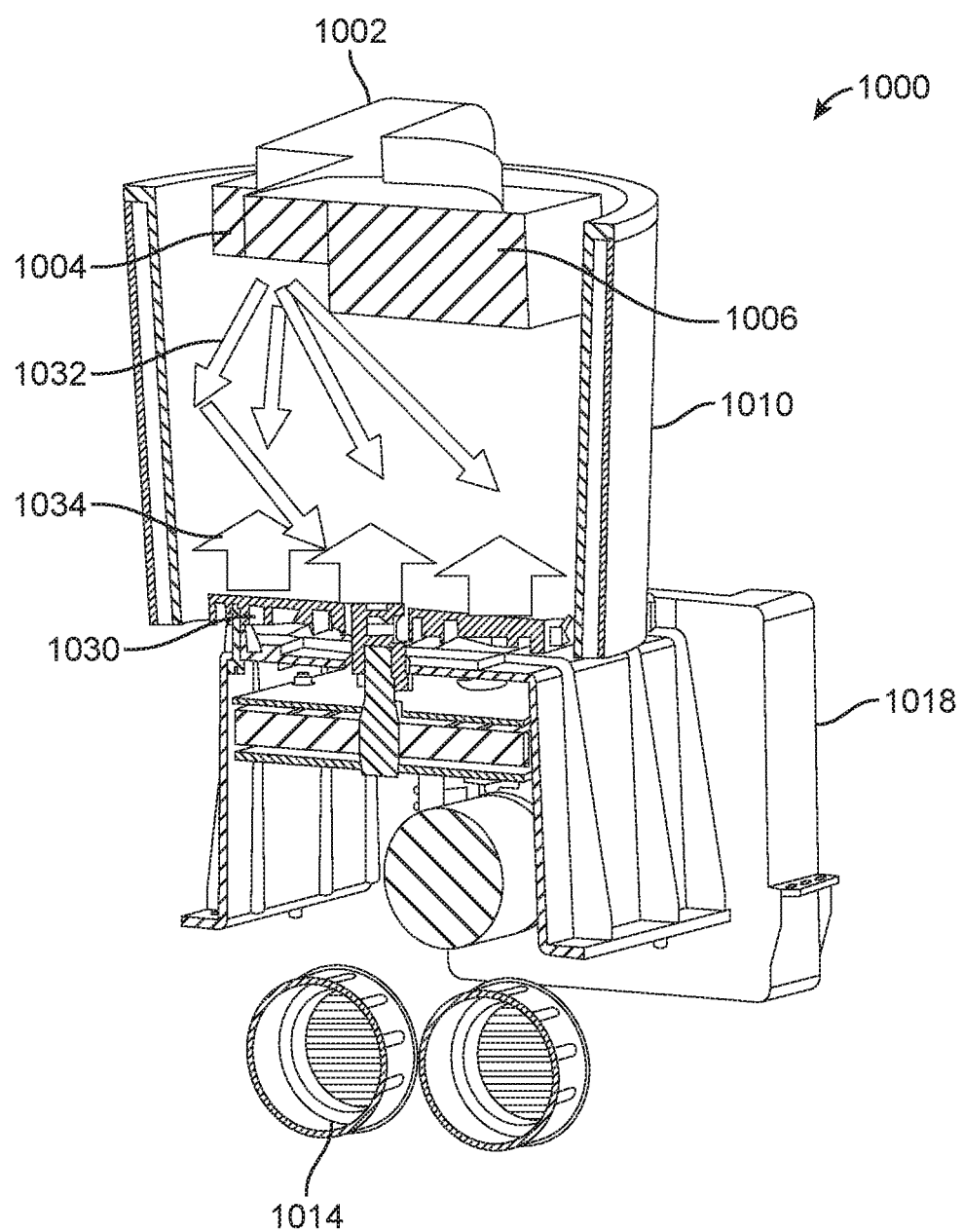

FIG. 10C further shows details of the waveguide 1004 within the food recycling system 1000. Air ducts 1002 are shown for retrieving air from the interior portion of the bucket 1010. The heated plate 1030 is in electrical communication with the control system 1018 such that heating of the bucket 1010 can occur at the appropriate time within the food recycling process. The RF component can be a magnetron 1006 which can provide microwaves to the waveguide 1004 for introduction 1032 into the interior of the bucket 1010. Heat can be generated from the heat plate and introduced 1034 also into the interior of the bucket 1010 to heat food.

Figure 10D:
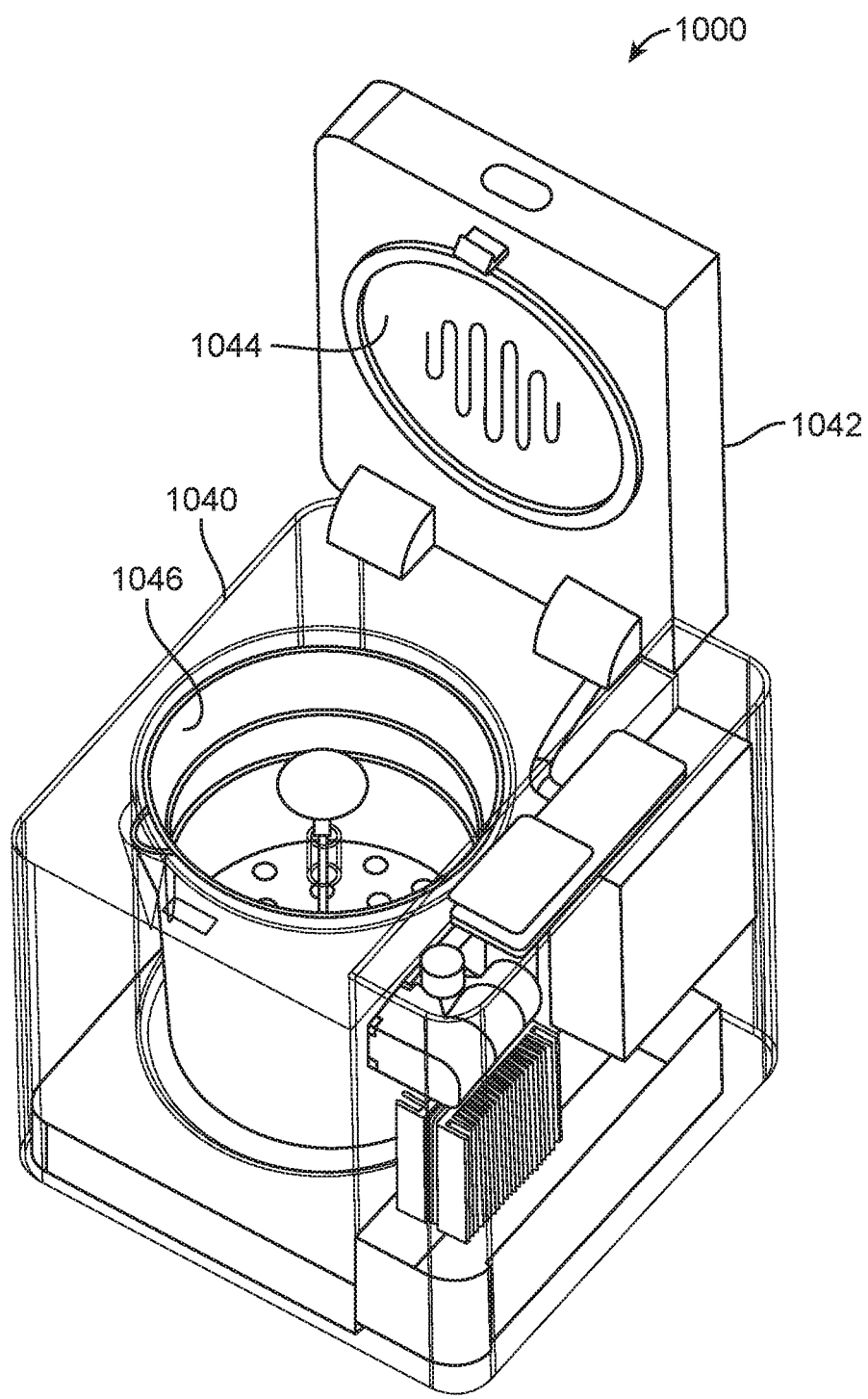

FIG. 10D illustrates another example of a food recycling appliance 1000 which includes an RF component 1044 configured within a lid 1042 of the appliance. The food recycling case or housing 1040 is shown containing the bucket 1046 and other various components.

Shielding can also be provided such that the lid 1042 includes a seal in connection with the food recycling case or housing 1040 such that as microwaves are introduced into the interior of the bucket 1046, the microwaves do not leak out of the contain space. Given the shape of the bucket 1010, 1046 and given the use of the grinding component or stirrer configured within the bucket for grinding and stirring the waste food, the waveguide 1004 is configured so as to evenly heat the waste food and to avoid hot spots.

In one aspect, the present system can include a camera system or other sensor system in connection with the use of the RF component such that a configuration of the waste food can be determined in preparation for microwave heating of the waste food. For example, a sensor system, in communication with the control system, can determine sensor data which can include one or more of a shape of the waste food, an amount of the waste food, a weight of the waste food, a type of the waste food, a density of the waste food, and so forth and make adjustments with respect to any aspect of the system which participates in the food recycling process. For example, the waveguide 1004 might be dynamic or adjustable such that depending on the sensor data, a particular waveguide configuration may be selected or configured in order to evenly heat the waste food and avoid hot spots. In another aspect, the system may utilize the sensor data to determine how to run the various stages of the food recycling process. For example, sensor data may be utilized to determine whether to start a grinding component in a clockwise direction or counterclockwise direction. The sensor data may be utilized to determine, as indicated by the control system, what type of microwave heating to perform, how much, how long, and under what configuration of the waveguide, to implement heating the waste food as part of the food recycling process. The sensor data can further be utilized to manage an air circulation system, the use of filters for filtering the air, the use of the heat plate, the combination of the use of the heat plate and the RF component for heating the waste food, a speed of the grinding component, a period of time in which any of these features are applied as part of a food recycling process, and so forth.

Figure 11A:
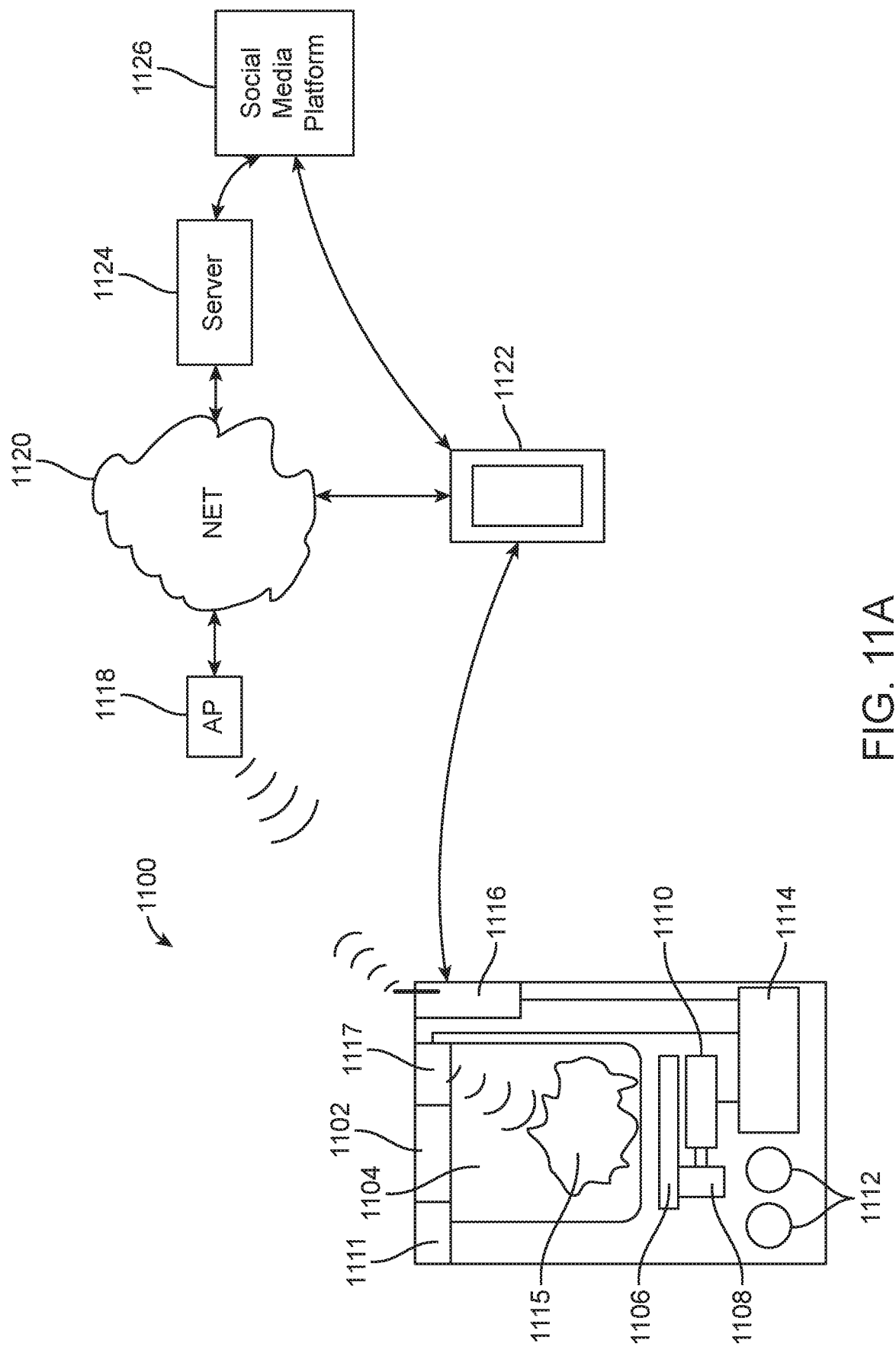
FIG. 11A illustrates an Internet of Things example configuration for the food recycler appliance.

FIG. 11A illustrates another example configuration of the system 1100 and includes an "Internet of Things" concept with respect to a food recycling appliance. This configuration includes a food recycling appliance 1102 that is configured with some of the components discussed above. In general, the following improvements to the traditional food recycling appliance enables the appliance to identify types of waste food and amounts of waste food and communicate such data to a network server for analysis and processing. By adding technical elements to the food recycling appliance that enables this type of analysis, and connecting one or more food recycling appliances to a network-based server, an overall ecosystem can be developed in which business intelligence data can be gleaned and evaluated for the purpose of providing opportunities for gamification, social media interactions, promotions, advertising, sales opportunities, regional or geographic-based communications, and so forth.

For example, the food recycling appliance 1102 includes a bucket 1104 contained within a food recycling appliance case. A gearbox 1106 communicates with a transfer case 1108 and the motor 1110. A control system 1114 communicates with the motor 1110 and other components as well, such as a wireless communication module 1116 and a sensor 1117. Feature 1106 can also represent a scale which can be used to weigh or determine the weight of the waste food 1115 placed within the bucket. A user interface 1111 is included which enables the user to provide input to the system in connection with performing a cycle of processing waste food. The filter system 1112 is also shown in connection with an air circulation system.

Waste food 1115 is placed within the bucket 1104 by a user of the system. This advanced version of the food recycling appliance 1102 has some additional features which provide increased usability and efficiency of the system. Generally speaking, including a sensor component 1117 and an enhanced user interface 1111 into the food recycling appliance 1102 can enable the system to determine the characteristics of the waste food 1115 placed within the bucket 1104. The sensor component 1117 can also sense a temperature of the waste food 1115 and determine whether it is hot or cold, whether it is frozen, and so forth. Either manually or automatically, by determining the characteristics of the waste food, sensor data can be communicated via a wireless communication module 1116 with an access point 1118 either in a user's home, or via a cell tower, or any kind of wireless component which can receive the data from the food recycling appliance 1102. The node 1118 will communicate a data through a network such as the Internet 1120 to a server 1124 associated with the food recycling appliance 1102. The server 1124 can communicate data to social media network 1126, which can also represent an advertising entity, game application entity, communication entity, and so forth. The server 1124 can communicate data through the Internet 1120 back to a device 1122 of the user. The alternate entity 1126 can also communicate data to the device of the user 1122.

The wireless communication component 1116 can communicate via WiFi, cellular technologies, 5G, Bluetooth, or any communication protocol that is desirable. The particular wireless protocol is not necessarily material to the present disclosure. With the capability of sensing characteristics of the waste food 1115, coupled with the capability of communicating data wireless lead to a network server 1124, the disclosed infrastructure enables new capabilities particularly with respect to the user experience in recycling waste food.

For example, the following scenario is enabled by virtue of the system disclosed in FIG. 11A. The food recycling appliance 1102 senses using the sensor component 1117 that the user of the recycling appliance has thrown away or consumed approximately 10 grapefruits within a one-week period of time. Either on a per cycle basis, or on an aggregated basis over a period of time, the food recycling appliance 1102 transmits sensor data or manual data provided by the user via a wireless communication component 1116 to network server 1124. The network server 1124 can evaluate the sensor data and apply, in one example, machine learning algorithms to evaluate and determine characteristics associated with the waste food of the user.

For example, a machine learning algorithm can be trained on visual data of typical or expected waste food. Banana peels, chicken bones, bread, grapefruit rinds, and so forth, can all be used to train a machine learning algorithm such that when new waste food is placed within the bucket 1104, the system can retrieve images of the waste food and make a classification decision or determination regarding the type of waste food that has been placed within the bucket 1104. The sensor 1117 can include a camera for taking images, video, a light for eliminating the contents of the bucket 1104, and so forth. The controller 1114 can include also machine learning data such that an evaluation of the contents of the bucket 1104 can be performed locally on the food recycling appliance 1102. For example, the machine learning algorithm can be trained on clean chicken bones and identify where there might be edible meat left on a chicken bone. By training the machine learning algorithm on what are known to be clean chicken bones as well as chicken bones that have some edible meat left thereon, the system can learn how to characterize edible portions of waste food and non-edible portions. This process can apply to any type of food in which there is a combination of an edible component and a non-edible component. For example, an apple may have remaining edible portions. A grapefruit might have some sections that are not eaten and can be identified as edible, etc.

However, in general, the computer processing that is described herein can be performed either locally on the food recycling appliance 1102 or remotely on a server 1124. The processing may also be partially performed on a local basis and partially be performed remotely. The system may also balance the computational location based on factors such as bandwidth availability, energy consumption, speed or a timing of when computational results are necessary, and so forth.

The machine learning training can also be based on moisture within particular foods. Thus, in addition to a visual representation of waste food, a machine learning algorithm can also be trained on the amount of moisture that is extracted from the waste food. For example, half-eaten grapefruit will have more moisture than a fully eaten grapefruit. The system can ultimately report to the user on a per cycle basis how much food waste has been processed and can provide a more particular report which can include an estimate of the edible food that was processed relative to the non-edible food that was processed.

In another aspect, the system, when sensing the contents or the characteristics of the waste food 1115, may cause the motor to rotate the bucket 1104 such that the sensor component 1117 can receive different views of the contents of the bucket 1104. Sensor data can thereby include multiple angles of use of the waste food 1115. The system could include a scale 1106 that also provides data with respect to a weight of the waste food 1115. The user may also provide additional intelligence regarding the waste food the communication with the food recycling appliance 1102 via a user interface 1111. For example, the food recycling appliance 1102 can include an automatic speech recognition system as part of its controller 1114 such that the user can open a lid, place several grapefruit halves into the bucket, and merely say "grapefruit". The additional simplified user input can enable user data to be coupled with the sensor data to improve the likelihood or the probability of successfully characterizing the waste food placed within the bucket.

The server 1124 can receive the various kinds of sensor data, user data, waste food weight, temperature of waste food, and/or any combination of such data and use that data to drive further communications with the user. For example, the system could coordinate with other network entities to determine a location of the user device 1122. If the user goes into their standard grocery store, for example, the system could utilize an analysis of the received data which provides insight into the characteristics of the waste food 1115 that the user has been placing within their food recycling appliance 1102, and could present either in advance or in real time food purchasing suggestions on a user device 1122. For example, because the system knows that the user has been eating a relatively high volume of grapefruit, the system could suggest to the user that they need to purchase additional grapefruit. The system could present recipes to the user which are coordinated with the type of food they are eating, or in one aspect, the type of food they should be eating, which might be more healthy than the food that has been identified as part of the waste food. For example, the system may evaluate one or more of the types of food that is recycled, an amount of moisture that is extracted from recycled food, a time associated with the recycled food, an amount of energy used to recycle the food, and so forth, and based on this data as well as optionally user profile data or aggregated data associated with a social networking group, to present suggested recipes or food items to the user for future purchases. The recipes could be tailored for improving food efficiencies. For example, the recipes might indicate a shift in the type of food that the user is eating or may focus on the types of foods that the user or household eats more of. In other words, if the first type of food is recycled with a relatively large proportion of still edible food, a recipe my focus on a $2^{nd}$ type of food that is recycled within the household, but that has a less amount of edible food remaining on average.

In another example, the system could be fine-tuned to identify which aisle the user is in within grocery store and can suggest items for purchase within that aisle. This aspect of the disclosure would include coordination with a server associated with a particular grocery store which identifies a location of respective items within the store. Knowing the food recycling history for a particular user, the system can make more tailored and specific advertisements or promotions for specific foods which are physically near the user in an in-store shopping experience. Such items can be suggested in connection with a recipe or just general items that the user is likely to desire to purchase.

The system 1124 can also generate a database of user profiles that can be based on the waste food data received from the food recycling appliance 1102. This data could be coupled with other data such as social networking data, data input from the user, and so forth to provide business intelligence that can drive advertising decisions to the user, friends or relatives of the user, and so forth.

The user could download an "app" from a server 1124 onto their mobile device 1122 which can also be used to communicate with the food recycling appliance 1102. For example, via a Bluetooth connection, the communication between the appliance 1102 and the user device 1122 could result in the following scenario. Assume that the food recycling appliance 1102 has received a new input of waste food 1115 into the bucket 1104. A preliminary analysis indicates that there is a relatively high likelihood that the waste food 1115 is grapefruit. However, the probability of classification has not reached an appropriate threshold. The appliance 1102, to communicate its pulmonary findings to the user device 1122, which could launch the app and simply request a 1-Click or simplified confirmation from the user of what the food waste consisted of. The user could receive a notification asking them to click on "1" if the food waste is grapefruit or "2" if the food waste represents oranges. The system could utilize the top N best list of possible options to present data to the user for disambiguating purposes. Furthermore, the user could of course enter or speak into their mobile device 1122 the waste food items as they are placing them into the appliance 1102 at the proper coordination between the user device 1122 and one or more of the appliance 1102, the server 1124, or end or entity can occur to coordinate the analysis of the waste food 1115 with the intelligence gained from the user input.

Further machine learning can be achieved by training models based on user profiles which can combine data regarding user characteristics (age, sex, hobbies, social media habits, purchasing habits, athletic activity, family circumstances, etc.) and food waste characteristics obtained by the food recycling appliance 1102. The machine learning data can also include aspects of timing. For example, given the particular user profile, and given the known timing associated with food recycling cycles that runs in connection with the type of food waste that the user is throwing away, the system can determine when a best time to advertise a particular food, or a particular recipe, or to make some other type of communication to the user. For example, an evaluation of the wasted food can lead to a suggestion that the user needs to exercise or workout given the fat content of the food that they are recycling.

Intelligence gained and stored by the server 1124 can also be coordinated with sales of food products. For example, the server 1124 to receive information from a grocery store chain the grapefruits are on sale for the next 2 days or that a large amount of grapefruit have been received at several locations and needs to be moved to the public and thus will have the price reduced. The system could select, based on the various user profiles, which users have been eating some or a lot of grapefruit and which are probable targets who would act upon a grapefruit sale.

Advertisements and information could be distributed either directly to the user device 1122 or through social media networks such as Facebook™ or Instagram™. Any social media outlet is contemplated as potentially receiving such data.

It is noted that the food recycling appliance 1102 is of the type and size that are disclosed herein rather than a larger commercial model. Accordingly, the intelligence that is gained is based on a bucket size typically between 2.51 Liters and 10 Liters a volume and within the confined space of an appliance case of approximately a total volume of 35 Liters or less. The reason for this restriction is that the food recycling appliance 1102 is designed for home use on a countertop. Configuring such a system requires additional innovations with respect to the size and positioning of the internal components and the business intelligence that can be obtained for such a system is more tailored to individual or family use within the home and the type of waste food and the amount of waste food which is processed in a single recycling cycle.

Currently, it is predicted that the average household wastes $2200 in food per year. One application of the technology disclosed herein includes the ability to train or notify users regarding the characteristics of their waste food, particularly with respect to an amount of edible food contained within the waste food relative to the non-edible food within the waste food. The information presented to the user device 1122 from the server 1124 can include such details as an estimate of the amount of edible chicken that has been thrown away over the past 2 months. For example, the system could determine that $30 of edible chicken was left on the bones that were recycled within the system over the last several months. A notification can include information of that analysis which could be presented to the user on the user device 1122 which can encourage them to be more efficient with respect to cleaning the chicken bones as they eat. The system could evaluate the edible/nonedible components of the waste food, arrive at a dollar value of the edible component, and provide aggregate reports on the amount of food waste for the household.

In one aspect, the app operating on the user device 1122 would enable an opt in feature in which the user could control the sensing and transmission of data regarding the waste food to the server 1124. The user would have control over privacy issues and be able to disengage the sensor 1117 as desired. Any control of the system could also be performed remotely by the user 1122 such as turning the device on, starting a cycle, controlling the use of the sensing component 1117, turning off the cycle, and so forth.

Another aspect of the system includes competition. For example, a group of users could start a game in which they were competing for some reward. The competition could be related to healthy foods eaten, the least amount of edible food wasted, the amount of wasted food, and so forth. Assume, for example, that 5 individuals signed up for a given competition project in which a six-month period will be evaluated with respect to their waste food and a prize will be given to the individual who wastes the least amount of food. Of course a trust factor is built-in in which the users are trusted to properly place their waste food into the food recycle appliance 1102. The system can then evaluate and track the characteristics of the waste food of the individuals over the predetermined period of time. Running data can be provided to each individual as well as to the individuals in the group with respect to how well they are doing and comparison to others in the group. A prize might be a gift certificate at a local grocery store or at a restaurant. At the end of the period of time, the center data retrieved from each of the food recycling appliances 1102 of the respective users is evaluated and compared to identify a winner in the particular category as it is defined. Such competitions can be also communicated through social media networks or individuals can be connected with other individuals with similar interests in improving their health or the type of food that they eat. The ability to understand and evaluate the food that is recycled within particular homes enables this type of game application. In general, a gamification concept includes receiving data from at least 2 independent food recycling appliances 1102 each with a respective individual, comparing and evaluating the respective data and then providing incentives or game application options to the individual users in ways that can encourage them to engage in particular behaviors which are beneficial to their health or improves the efficiency of their food intake.

In one aspect, the determination of edible food, nonedible food, a classification of food, and so forth can be determined by a detection of an amount of humidity that is within the bucket or within the food. For example, if one were to put an apple in the bucket and run a food recycling cycle, the system could evaluate how much humidity was withdrawn from the apple and thereby calculate or determine that it was an apple that was recycled. Thus, the amount of moisture that the system extracts from waste food is one aspect of how the system can determine or classify a type of the waste food. From such calculations, the system can determine how much food waste weight can be saved. The food recycling appliance 1102 can, for example, include the amount of humidity or moisture extracted from the waste food as part of the center data that is transmitted to the server 1124. Visual sensor data, user input data, and so forth can be supplemental data which can further refine the probability of successfully categorizing or characterizing the waste food.

Another aspect of sensing the type of waste food that is placed within the bucket can include sensing the waste food as it is being placed within the bucket. The sensing module 1117 can be included in a lid that is lifted to an open position as waste food is entered into the bucket. A top portion of the food recycling appliance 1102 could also include a camera sensor. The system could begin to evaluate a food type as the user brings the food to the bucket. For example, if the user has one half of a grapefruit that is being placed within the bucket, the system could begin to capture images of the half grapefruit as the user is holding the half grapefruit above the appliance and is moving towards placing the half grapefruit in the bucket. The system could even provide feedback to the user to show a different side of the food items or to rotate the food item and then provide a light or an audible beep when the system has properly identified the item. This could be helpful particularly where multiple items are placed within the bucket and the sensory system might have difficulty characterizing the food within the bucket if, for example, there is a combination of a grapefruit and a chicken bone. Where multiple items might be placed within the bucket, having the system sense the items as they are being placed within the bucket can be helpful. Again, the user could also simultaneously say "chicken" or "grapefruit" or "soup" as they place items within the bucket which data would further be coordinated with the machine learning algorithms to quickly identify the waste food.

In another aspect, the user could utilize the app on the user device 1122, to take pictures of the food that is going to be recycled. For example, if a couple has finished their meal and is going to recycle the food on their plates, they could simply take a picture of the food on their plates via the app or via their camera app. That image could be coordinated with other sensory data from the food recycling appliance 1102 (humidity, weight, other images, other user input, and so forth), to classify or characterize the waste food.

In one aspect, the server 1124 can store profiles based on individual users, households, groups of users, and so forth. The data can be aggregated and/or anonymous and be sold to advertising entities or other entities that might be interested in such business intelligence data. For example, restaurant advertisers or grocery store advertisers might be able to utilize the data for targeting a particular demographic which is known, via the center data gathered herein from the food recycling appliances, for eating a certain amount of food. The system could also provide geographic business intelligence data. For example, if a number of individuals in a city utilize the food recycler appliance 1102, the system could identify that the amount of grapefruit recycled in a given neighborhood or a given portion of the city, has spiked in the last month. This information could be utilized to drive an advertising campaign by a grocery store for a discount on grapefruit which could be targeted to that geographic region.

Another aspect of this disclosure involves prediction algorithms. Historical usage of food recycling appliances 1102 can be processed and evaluated for prediction purposes. For example, advertising, gamification, or other notifications can be provided to users based on a predictive algorithm that in the following month, the amount of grapefruit or chicken that is recycled is likely or predicted to spikes. Discounts, coupons, rebates, and so forth can be provided to users on a profile basis, geographic basis, and so forth, according to or based on predicted food waste.

The sensor data associated with waste food can also be received and coordinated with other data regarding shopping habits, whether online or in store. For example, users might be able to coordinate data regarding their grocery store purchases and make such data available to the app under device 1122 or to the server 1124 such that an overall global view of their purchasing habits as well as their disposal or recycling habits can be evaluated. In this regard, reports might be presented to the users which can help to identify the fact that they purchased a certain amount and type of food, but did not recycle as much of that food as was predicted or that should have happened. In this regard, the system can provide reports to users which present a comparison of food purchased by a household relative to food recycled by the household, with the appropriate estimation of timing or an expectation of recycled food relative to food purchase. For example, the system can take into account perishables relative to canned food. Thus, by tapping into food purchases, the server 1124 can give an even a better picture for individual households with respect to potential additional food recycling, which can occur.

Advertisements can also be presented directly on the user interface 1111 of the food recycling appliance 1102. A graphical interface can include a touchscreen, like the touchscreen of an iPhone for example, that users can access and accept offers or promotions. Such offers and promotions can be coordinated with an app on their device 1122 for redemption.

Any subsystem (motor, air circulation, filtering system, heating system, sensor, etc.) can have its status remotely checked from the server 1124. For example, a central control operated from the server 1124 can report that 10 filters in a particular region need to be replaced. The central control 1124 can coordinate and aggregate status data of a plurality of distributed appliances 1102. In another aspect, the filters 1112 on the appliance 1102 can be removable. For example, a removable filter might be expected to function in removing odor from the air for a period of 6 months. The system could sense the effectiveness of the filters based on air data, number of cycles used, amount of waste food processed in the plurality of cycles, amount of humidity extracted from waste food, and so forth. The appliance 1102 could report to a centralize server 1124 the status of the subsystem, such as the filter system, and could provide a notice to the user via the user interface 1111, an app or user interface on a device 1122 or in some other fashion to notify them to change their filter in a certain amount of time, such as 2 weeks. In one aspect, the server 1124 could coordinate with a merchant site represented by 1126, such as Amazon.com, to pre-order or preconfiguring an order, which can be presented to the user, simply to confirm the purchase. For example, if a new filter should be delivered within 2 weeks to the user, the system 1124 could communicate the data to the merchant site 1126, who could configure a presentation of a user interface through which a purchase of the needed filter could easily occur. The user could simply confirm the purchase via a fingerprint. The system could then access their user address information such that no manual entry would be needed for the purchase. The user interface 1111 could also include a biometric reader for facial recognition or fingerprint recognition or the like.

Figure 11B:
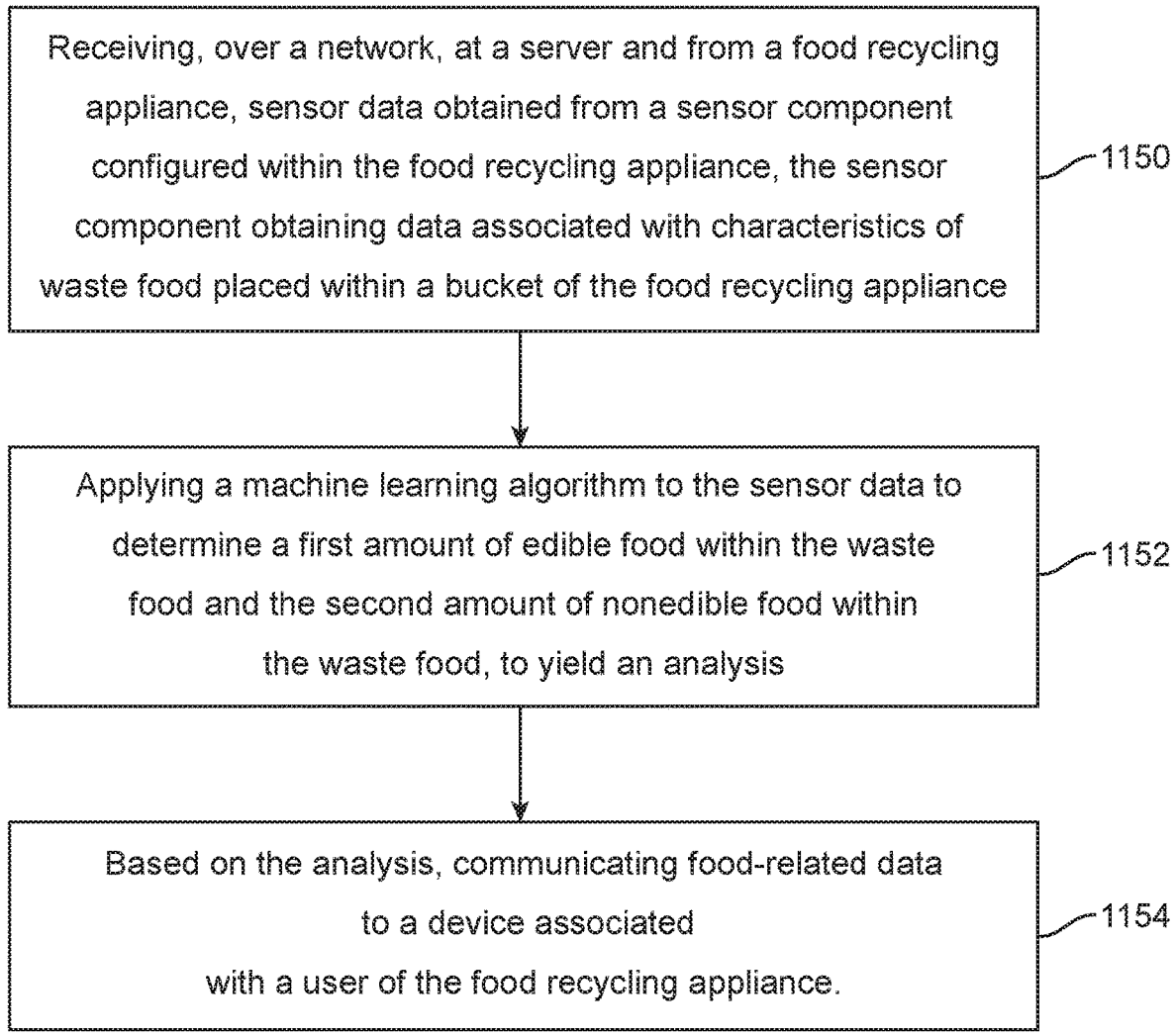
FIG. 11B illustrates an example method associated with an Internet of Things example of the food recycler appliance.

FIG. 11B illustrates an example method according to an aspect of this disclosure. A method includes receiving, over a network, at a server and from a food recycling appliance, sensor data obtained from a sensor component configured within the food recycling appliance, the sensor component obtaining data associated with characteristics of waste food placed within a bucket of the food recycling appliance (1150), applying a machine learning algorithm to the sensor data to determine a first amount of edible food within the waste food and the second amount of nonedible food within the waste food, to yield an analysis (1152) and, based on the analysis, communicating food-related data to a device associated with a user of the food recycling appliance (1154).

The food-related data can be one of associated with a gamification process which encourages the user to purchase certain foods, a social media campaign in which the user is compared to other users in a social media group with respect to food recycling practices. The method can further include communicating data to a social networking platform which, based on the data, presents information to the device associated with the user within the social networking platform.

The sensor data can relate to one or more of an amount of humidity withdrawn from the waste food, a temperature of the waste food, a weight of the waste food, and a type of the waste food. In another aspect, the machine learning algorithm can be trained on example waste food items having a first known amount of an edible component and the second known amount of non-edible component.

The method can include receiving user input data received at the food recycling appliance, the user input data characterizing the waste food. The method can also include generating, based on the analysis, a value of an amount of edible food that was contained within the waste food and presenting the value of the amount of edible food was contained within the waste food to the device. In another aspect, the system can calculate the value of the amount of edible food that was contained within the waste food as associated with a plurality of food recycle cycles over a given period of time. In another aspect, communicating the food-related data to the device associated with the user of the food recycling appliance can further include indicating a recipe to the device based on the sensor data.

In another aspect of this example, the network-based server 1124 could provide control over a group of food recycling appliances. For example, energy usage per cycle could be evaluated for one or more food recycling appliances and a corresponding cost of energy on a geographic basis could be evaluated such that the network-based server 1124 could transmit a modification of part of the food recycling process for a particular group of food recycling appliances, which causes them to use less energy per cycle. A service level agreement is to be provided to individual users which could maintain a certain cost of energy, were certain energy usage on average for cycles. In another aspect, for example, a food recycling process could be modified based on the detection of a temperature of the waste food deposited within the bucket. If hot food is deposited within the bucket, then less energy might be needed in the cycle to heat the food as part of the recycling process. Such modifications to a standard food recycling cycle can be handled locally based on sentenced data, could be controlled remotely from a network-based server 1124, or may be coordinated between the two entities in which final modifications to a food recycling process can be determined in a coordinated effort.

The network-based server 1124 can retrieve an aggregate data about the waste food processed in a plurality of respective food recycling appliances and process this data to enable both business intelligent reports which can provide intelligence with respect to the type of food that is being recycled, an amount of energy required to recycle a purchase particular amount of food, and so forth. In one example, predictive algorithms can be used which can predict for an individual, a social networking group, a geographic region, and so forth, what type of food is expected to be processed in the food recycling appliances. Based on this prediction, the network-based server 1124 could communicate a revised food recycling cycle to particular food recycling appliances. For example, if it is expected over the next month given the weather, holiday seasons, events and the news, economic conditions, or so forth, that more of a particular type of food will be recycled, and less energy per cycle might be required for that particular type of food. The network-based server 1124 could cause an adjustment to the food recycling cycle in preparation for the expected type of food. For example, if less waste food containing bone is expected, then less grinding and chopping would be required to process such food. Similarly, if a greater amount of energy might be expected, then an increased cycle might be communicated to food recycling appliances. Again, this process could also occur locally where the amount of energy used per cycle could be adjustable based on a sentencing or detection, or through user input, of the type of food that is in a given bucket and ready to be recycled. Using these techniques, the overall system can improve and tailor the amount of energy used per cycle to be more closely aligned with the type of food that is placed within the bucket to be recycled. This can provide an overall improvement in energy usage.

Claims can be directed exclusively to steps that occur in the examples set forth above on one or more of the food recycling appliance, a device separate from the food recycling appliance and which is operated by the user, a network-based server that communicates with the food recycling appliance, or a separate network-based entity that receives data from the network-based server and provides advertisements, discounts, medications, or other data to a user or a group of users. The separate network-based entity can be a social media network as set forth above. All of the transmissions, requests, responses, analysis of data, the graphical user presentations, and so forth are included as within the scope of this disclosure from the standpoint of each separate node or entity disclosed herein. In other words, one claims that could be directed to a social media network that receives the type of data that is gathered from the analysis of waste food at a food recycling appliance of the type disclosed herein, and wherein the social media network performs certain actions by way of postings, promotions, advertisements, or coordinated communications to users in a particular social media group or to individuals. Other claims could be directed to actions purely performed by the food recycler appliance and data that it receives through its analysis of the waste food as well as other inputs from the user and processes, transmissions, data received, control information it receives, and so forth.

Figure 12A:
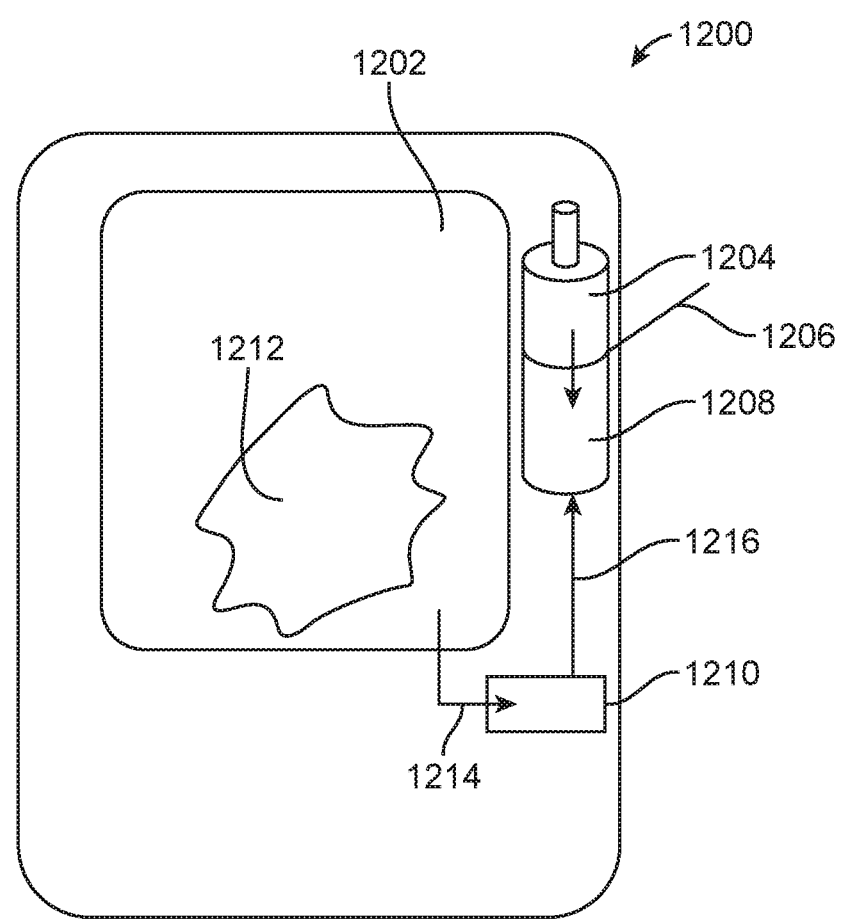
FIGS. 12A-12F illustrate various aspects of using a replaceable filter in a food recycler appliance.

Another aspect of this disclosure relates to odor control. In the previous version of the food recycler, shown in FIG. 2B, the filters 226 are built into the food recycler case and are essentially permanent. There is no easy mechanism of replacing the filters. Where a technician may need to go in and replace the filters, as they are shown in the figure, the filters are hardened cylindrical objects. FIG. 12A illustrates or another aspect of this disclosure in which a new food recycler appliance 1200 is provided with the ability to receive a replaceable filter. The food recycler appliance 1200 includes the bucket 1202, waste food shown as feature 1212, an air circulation system 1210 which retrieves air 1214 from the bucket as part of a drying component and provides the air 1216 to a filter 1208 which includes a replaceable filter bag 1204. A door 1206 opens to reveal a filter receiving structure 1208 that receives the filter bag 1204. The filter is configured to have a structure with an air permeable outer covering or mesh which contains active carbon or any other type of filter material. A handle can be configured on the filter bag 1204 as well. The location of the filter receiving structure can be anywhere within the case of the food recycler appliance 1200. The air circulation system 1210 only needs to be able to be configured to cause air to flow through the replaceable air filter 1204.

Figure 12B:
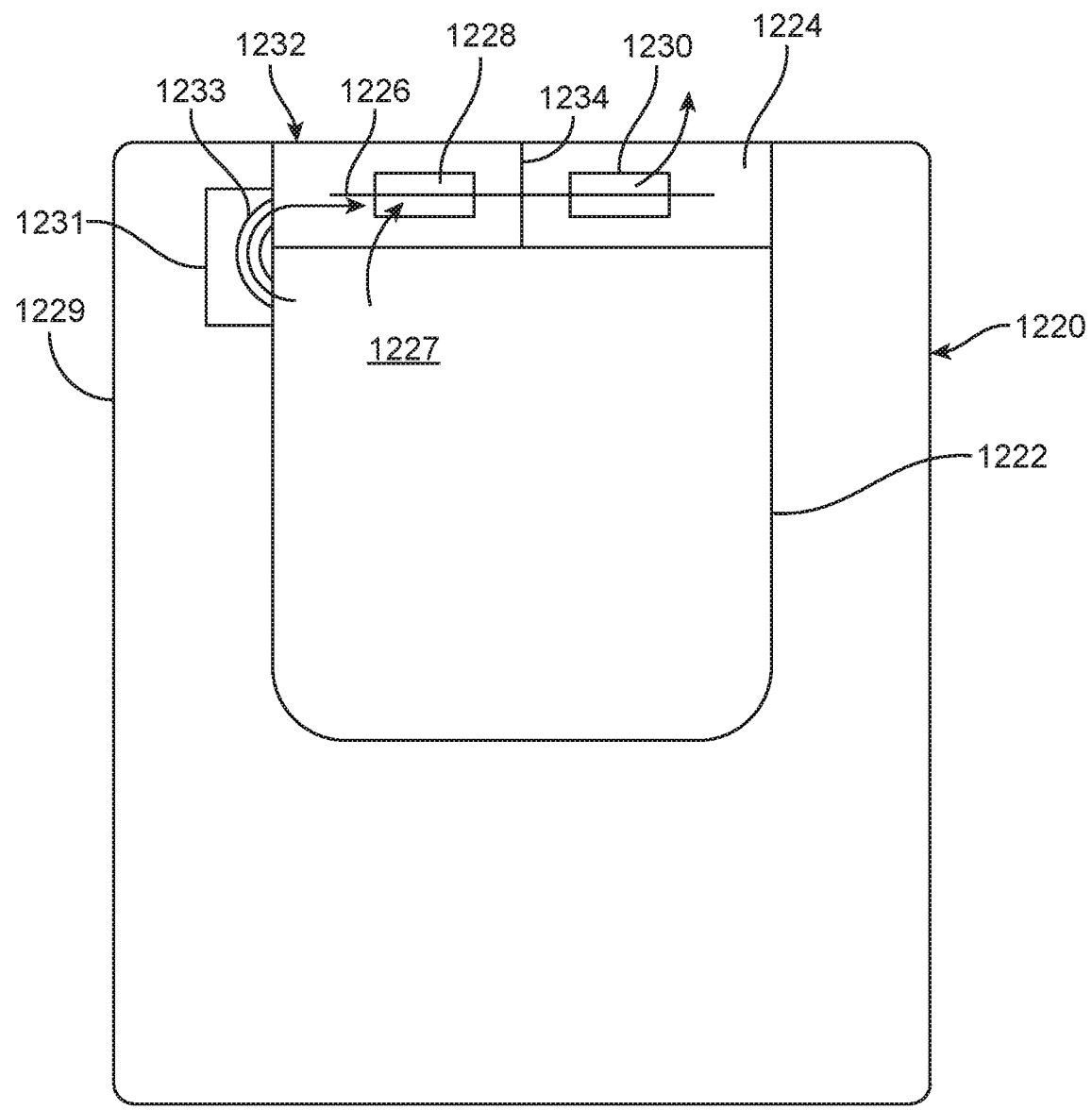

FIG. 12B illustrates an aspect of this disclosure in which a filter 1226 is configured within a lid 1232 of a food recycler appliance 1220. The lid 1232 is typically configured above the bucket 1222. The filter 1226 can be ring-shaped, circular and can, in one aspect, include slits or complimentary structures to barriers or structures within the lid 1232. One benefit of positioning a replaceable filter 1226 within the lid 1232 is an efficient use of space within the food recycler appliance 1220. The current lid in the recycler shown in FIGS. 2A and 2B is essentially just plastic with no other structural use. A lid which contains a replaceable filter is restructured such that an intake opening 1228 is provided to receive air from the interior of the bucket 1222 such that the air can flow through the filter 1226. A barrier 1234 is provided in which the airflow can move through the filter 1226 and out and exhaust opening 1230 and into the atmosphere. An interior portion 1224 of the lid 1232 is reconfigured to enable air flow through the lid and ultimately out into the atmosphere. In one scenario, an upper portion 1229 of the food recycling appliance 1220 is also reconfigured to provide the air circulation system or drying component 1231 which will draw air from the interior 1227 of the bucket 1222 and guide it through air ducts 1233 to the lid 1232 for filtering.

Another aspect of FIG. 2B includes the ability to open a panel either on the top of the lid or below the lid for accessing and replacing the replaceable filter 1226.

Figure 12C:
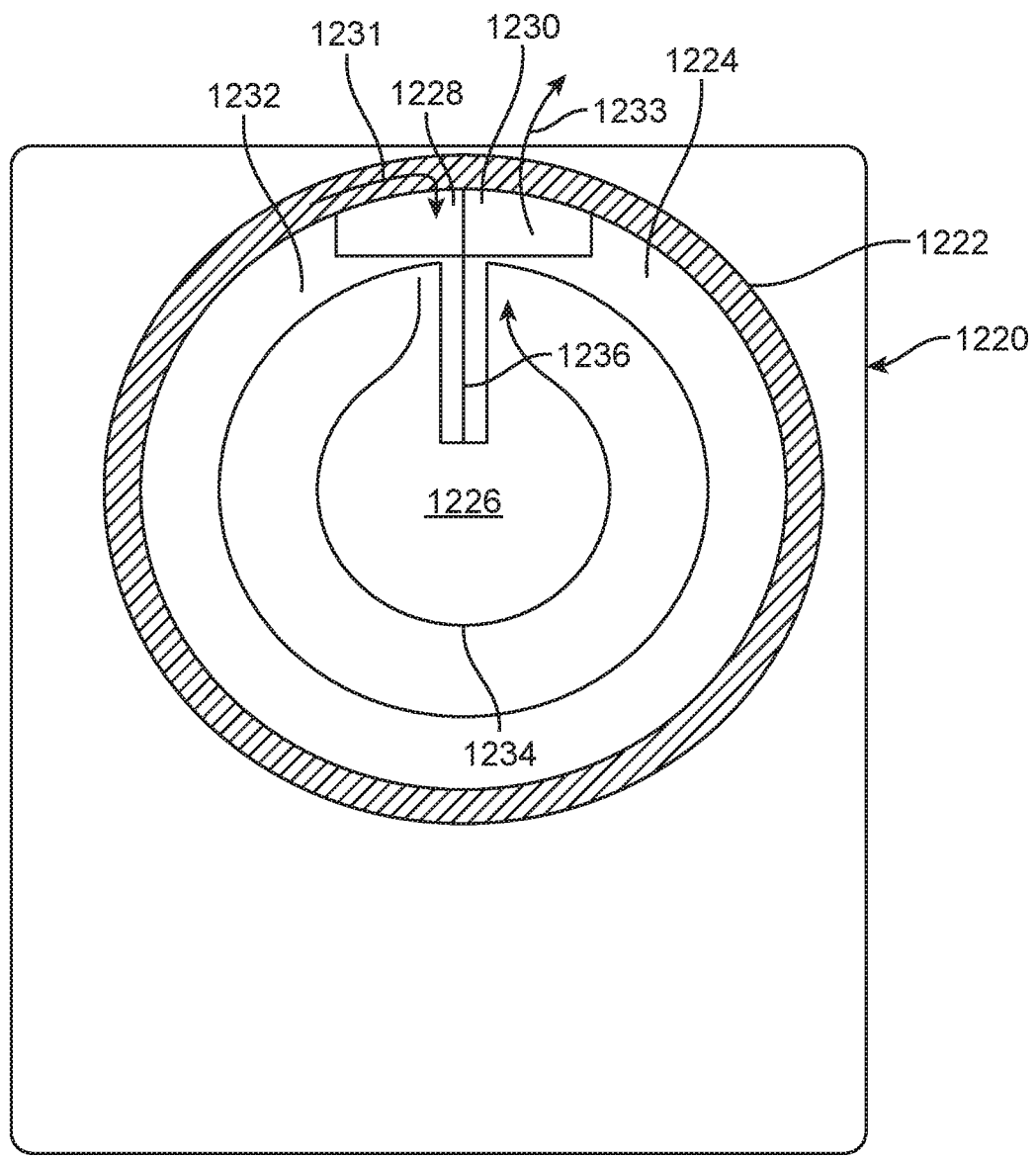

FIG. 12C illustrates a top view of the lid 1232 position within the food recycling appliance 1220. The bucket is shown 1222 and an arrow 1231 representing airflow from the bucket 1222 into the intake opening 1228 which represents air being received from the air circulation system for processing through the air filter 1226. The barrier 1232 is also shown which can be used to guide or control the flow of air through the lid having the filter 1226.

The arrow 1234 illustrates generally the airflow path through the filter and which ultimately leads to the export opening 1230 and the arrow 1233 representing the exit of air into the atmosphere. As can be appreciated, the air filter 1226 shown in this figure can be generally pancake shaped with a slit built into the filter which is complementary to the barrier 1236. Other structures within the interior 1224 of the lid 1232 can also be adjusted to manage or control the airflow through the interior of the lid in the space which is designed to receive the replaceable error filter 1226. It is noted that arrow 1231 and arrow 1233 only generally represents the flow of air into the lid for filtering and the flow of filtered air from the lid. The air circulation system can be configured within the interior of the food recycler appliance 1220 in any manner for retrieving the air from the bucket 1222, and controlling the flow of the air into the lid 1228, through the filter 1226, and through an exit port 1230.

In one example, while FIG. 12C shows the entrance port 1228 adjacent to the exit port 1230, the positioning of the entrance port 1228 in the exit port 1230 can be at any location within the lid. For example, the lid 1232 may consist of an entrance port generally in the position of port 1228, and include no barrier 1236, but have an exit port on the side opposite the entrance port 1228. The overall air circulation system can be adjusted to provide the air at any position of the lid and to retrieve the filtered air from any position of the lid. A brief reference to FIG. 3A notes the position of an opening 360 on a side of the lid 304. The upper portion of the food recycler 300 in that figure has been removed and some of the internal structure of the casing is shown. In this example where in the lid 304 is reconfigured to receive a replaceable filter, the air intake or air export openings can be configured on a side of the lid as is shown by feature 360. As other internal air circulation system, air ducts can be connected to such side openings configured within the lid.

Figure 12D:
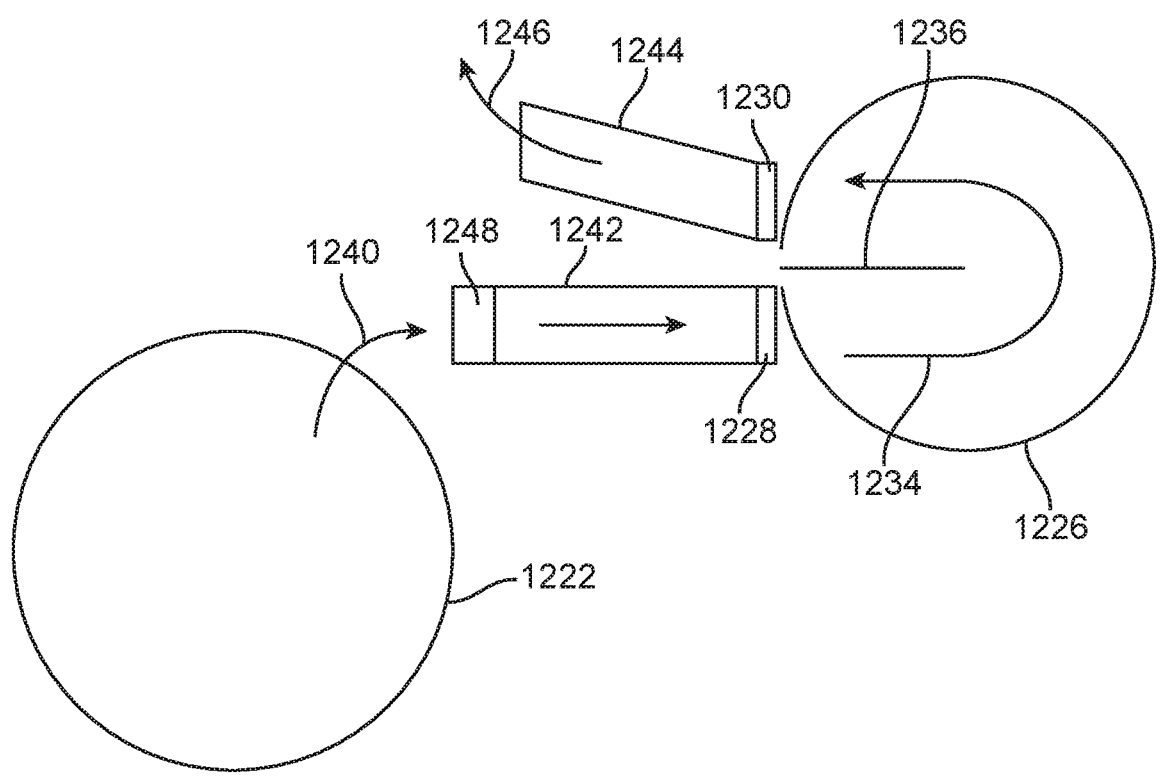

FIG. 12D shows another aspect of the air circulation system. The bucket 1222 is shown with air flow from the bucket 1240 to a fan 1248 that is part of an air circulation system 1242. The heirs directed to the intake port 1228 which causes the air to flow through the filter 1226 and a pattern or pathway shown by feature 1234. The barrier 1236 is shown in this example as well. The exit port 1230 can direct the air to another air duct 1244 which ultimately directs the air 1246 to the exterior of the food recycler appliance 1220. As noted above, the position of the air intake port 1228 in the air export port 1230 can be anywhere in the lid. It is preferable that these ports be configured on a side portion of the lid. It is also preferable that the fan 1241 is configured within the food recycler appliance 1220 outside of the lid and the bucket 1222. However, in other configurations, the fan 1241 could be configured within the lid with an air intake opening 1228 on the under side of the lid so as to draw air directly from the bucket 1222 into the lid for filtering. In other words, one opening could be on and under side of the lid and another opening could be on a side portion of the lid, or even on a top portion. For example, lid configuration could include a fan structure for drawing air directly from the bucket 1222 through an opening underneath the lid, the interior of the lid could be configured to force airflow over a sufficient amount of the necessary filtering material, and the lid could be configured with an exit port that is on top of the lid which causes the filtered air to exit the food recycling appliance 1220. In this configuration, one benefits of this approach is the elimination of a need for an air circulation system within other parts of the food recycling appliance 1220 which can enable an increase in the size of the bucket 1222 for improved efficiency.

Figure 12E:
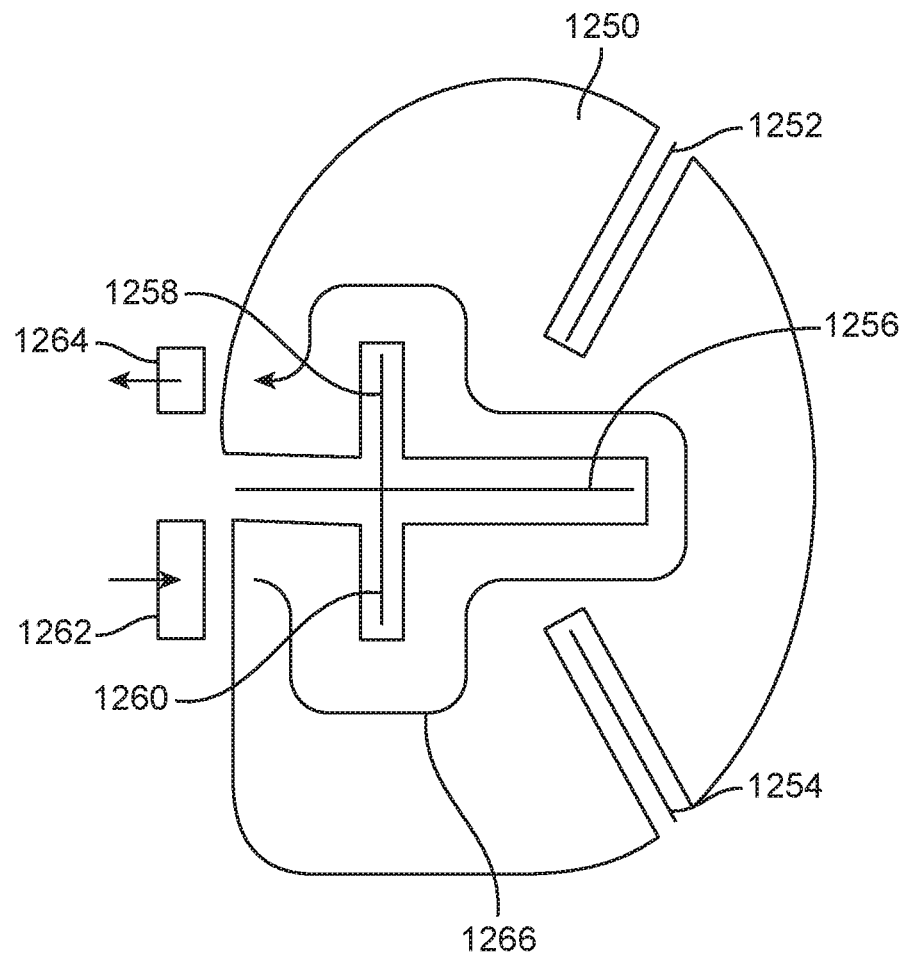

FIG. 12E illustrates another aspect of this disclosure and which a filter configured for the lid is generally pancake shaped, but wherein the lid includes additional barriers 1252, 1254, 1256, 1258 and 1260. These are example barriers which cause a particular path 1266 of the air to flow from an intake port 1262 through the filter 1250 around the various respective barriers and to an exit port 1264. This example shows how a particular airflow could be designed within the lid of the food recycling appliance 1220. With this design, the air intake opening 1262 and the air exit opening 1264 could similarly be configured on a side of the lid, or on a respective top and bottom portion of the lid, and so forth. The lid in this scenario could also include one or more fans which could be configured at any location along the path 1266 and for drawing air from the interior of the bucket, through the filter 1250 and to the exterior of the food recycling appliance 1220. The pathway 1266 can essentially be configured as a maze in which the path of the air is controlled to move through the maze in a particular order as one would traverse through a maze.

Figure 12F:
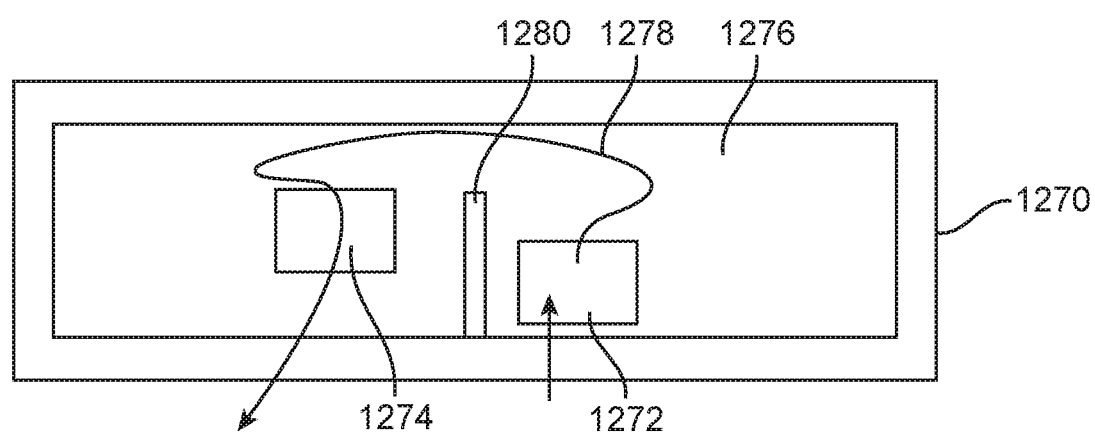

The above examples of a replaceable filter typically contemplate a generally pancake shaped filter that fits within the lid or a filter that might be shaped like a tea bag and that has positions within a filter receptacle within an interior of the food recycler appliance 1220. FIG. 12F illustrates another approach in which the lid 1270 is shown with an interior portion in which a filter 1276 is provided in which a spiraling effect with respect to airflow 1278 can be experienced. In this scenario, the filter can be considered not shaped like a pancake, but more as a stack of pancakes or, more generally, like threads of the screw. In this manner, air would flow into the air intake port 1272 at one elevation and the air would travel along a path 1278 in which it might travel numerous times around a central structure 1280 in a spiral fashion and ultimately exit and exit port 1274 at a higher elevation than the intake port 1272. One benefit of this type of approach is that it can enable air to flow over more active carbon material (relative to the pathway envisions in FIG. 12D) and thus improve the filtering of the air. In this case, the structure of the filter 1276 is modified such that it may include its own barriers between layers of the filter such that some aspects of the control of the path of the air is built into the filter itself. Shapes of the filters described herein are generally considered to be circular, but they can be square shaped, rectangular shaped, arbitrarily shaped, oval-shaped, and so forth.

In one aspect, the lid 1270 is configured to receive more than one filter such that multiple filters processed the air within the lid 1270. Access to the interior cavity can be from a top of the lid, a bottom of the lid, or even from a side portion of the lid for a user to access the interior filter cavity and for removing all filter and inserting a replacement filter.

In another aspect, it is generally assumed that the amount of active carbon within the filter is uniformly applied across the filter. In other aspects, the amount of active carbon within the filter could vary, particularly along a complicated pathway. For example, the filter 1226 shown in FIG. 12D can have a larger or thicker component near the intake opening 1228 and be thinner or have less active carbon near the exit port 1230. Included within this disclosure is the concept of varying the thickness or the physical amount of active carbon within the filter either up or down along the pathway of airflow through the filter. In one aspect, for example, an overall filtering system might include one filter configured within the lid of the food recycling appliance 1220, but also include another filter at another location within the food recycling appliance case prior to the air exiting into the atmosphere. This may be a requirement where additional filtering is needed to properly control for odor. This approach, relative to the filters shown in FIGS. 2A and 2B, still increases the available space within the food recycling appliance 1220 for an enhanced bucket size. In this respect, the overall air circulation system and filtering operation could include a first filter having a first shaped and configured within a lid of a food recycling appliance 1220, which would process first air to yield first filtered air. The air circulation system could then communicate the first filtered air to a second filter contained within the food recycling appliance 1220 that is contained within the interior portion of the food recycling appliance 1220, but external to the lid. The air circulation system could also first cause the air to flow through a first filter that is external to the lid and then complete the filtering process by forcing the filtered air through a filter configured within the lid. It is contemplated within this disclosure that these various air circulation systems could be configured in which each of the filters is replaceable and easily accessible by a user.

Another example aspect of this disclosure could be directed to the claims focused on the replaceable filters themselves, their structure, and in one case their use within a food recycling appliance 1220 having the general configurations disclosed herein.

Figure 13:
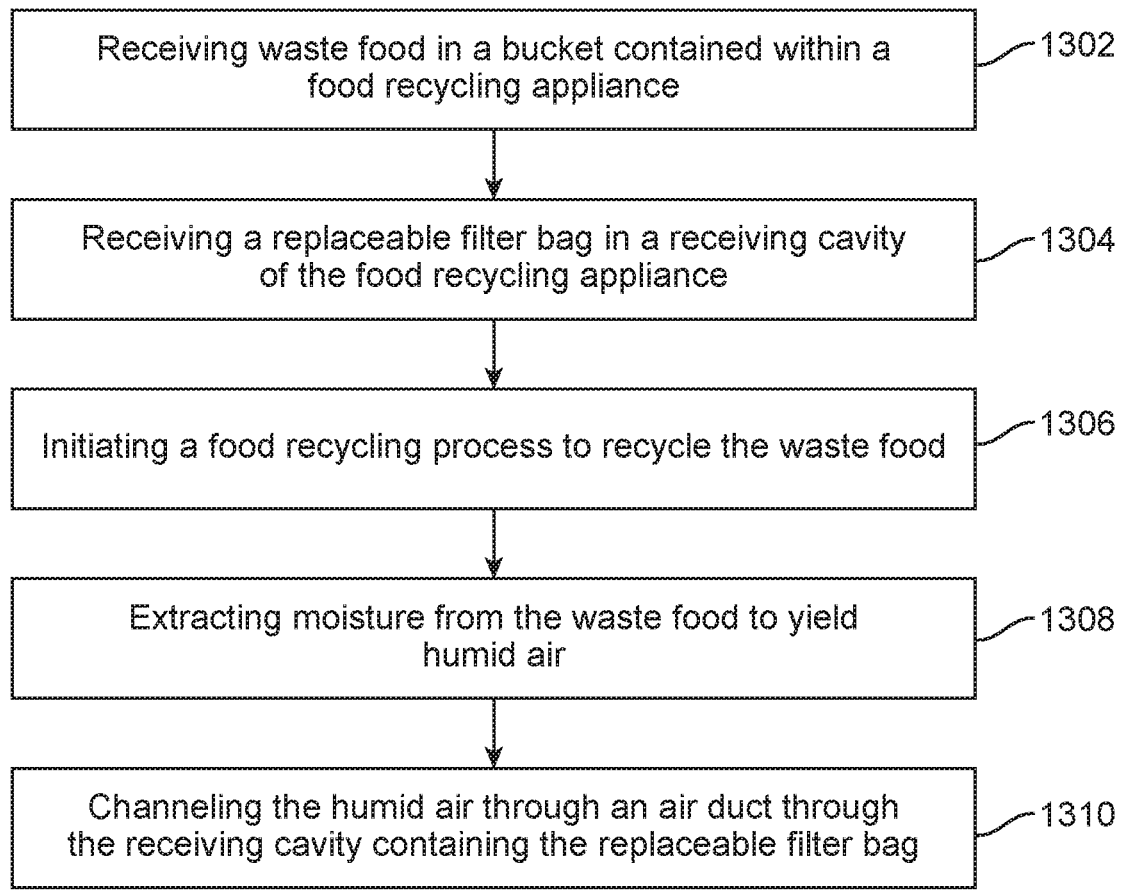
FIG. 13 illustrates a method example.

FIG. 13 illustrates a method example with respect to using replaceable filters in a food recycling appliance. The method includes receiving waste food in a bucket contained within a food recycling appliance (1302), receiving a replaceable filter bag in a receiving cavity of the food recycling appliance (1304), initiating a food recycling process to recycle the waste food (1306), extracting moisture from the waste food to yield humid air (1308) and channeling the humid air through an air duct through the receiving cavity containing the replaceable filter bag (1310). As noted above, channeling the humid air can include directly receiving the air into the lid from the interior of the buckets for filtering or through a separate air circulation system. Replaceable filter bag can represent a replaceable filter position within the food recycling appliance exterior to both the bucket and the lid structure or if it can include a filter configured to be position within the lid.

A ratio of a volume of the bucket relative to an overall volume of the food recycler can be between 0.0717 and 0.2857. The food recycler can, in one aspect, have particular dimensions which are beneficial for a home appliance. As noted above, the food recycler is configured to have an overall appliance volume of 35 liters or less and the bucket has a capacity to receive waste food of between 2.51 liters to 10 liters, inclusive. Thus, the volume of the bucket can be between 2.51 liters or 10 liters, in size. Based on the ratio of the first volume of the bucket relative to the overall volume of the food recycler, the overall volume of the food recycler can be between 8.79 liters and 35 liters. In some instances, the configuration can include one or more of a height of approximately 380 millimeters, a width of approximately 270 millimeters and a length of approximately 310 millimeters.

The replaceable filter bag can be one of ring-shaped, circular, square or configured to fit within the receiving cavity contained with the lid. The replaceable filter bag can have a structure which enables a spiral airflow through the replaceable filter bag within the lid of the food recycler appliance. An air circulation system can be configured to pass air received from the bucket through an air channel to an intake opening in the lid, through the receiving cavity containing the replaceable filter bag, and out an exit opening in the lid. The air, as it travels through the receiving cavity containing the replaceable filter bag, can move in one or more of a spiral configuration, a circular configuration, a maze-shaped configuration, and a multi-layered configuration. The method can include receiving a first replaceable filter and a second replaceable filter within the food recycling appliance.

Figure 14:
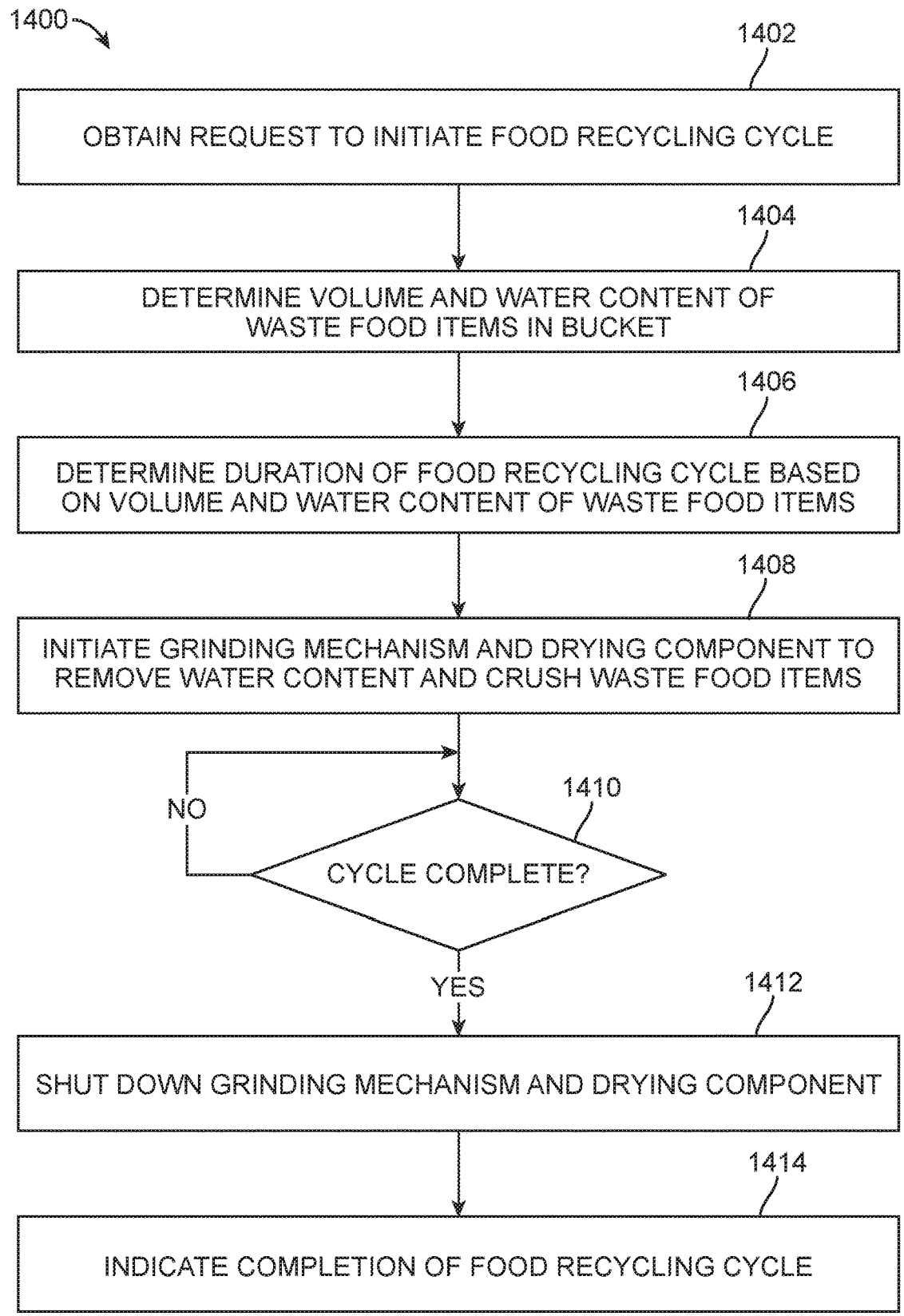
FIG. 14 illustrates an example method related to using a food recycler to recycle waste food.

FIG. 14 illustrates an example method 1400 related to using a food recycler to recycle waste food. The method 1400 may be performed by a controller of the food recycler, which may be in communication with one or more components of the food recycler to cause performance of a food recycling cycle for recycling waste food introduced into the bucket of the food recycler. The method 1400 includes obtaining a request to initiate a food recycling cycle (1402). For instance, the controller may detect that a user of the food recycler has used a UI component of the food recycler to submit a request to initiate a new food recycling cycle. Alternatively, the controller may detect that the user has closed the lid of the food recycler after insertion of waste food items into the bucket.

The method 1400 further includes determining the volume and water content of the waste food items present in the bucket (1404). Based on this information, the controller determines a duration of the food recycling cycle (1406). Once the controller has determined the duration of the food recycling cycle, the controller initiates the grinding mechanism and drying component of the food recycler to remove the water content from the waste food items and to grind and crush the waste food items (1408). During operation of the grinding mechanism and of the drying component, the controller determines whether the food recycling cycle has been completed (1410). For instance, the controller may determine that the food recycling cycle is complete based on the remaining water content of the waste food items. Alternatively, the controller may determine that the food recycling cycle is complete after a pre-determined period of time has elapsed.

If the controller determines that the food recycling cycle has been completed, the controller can shut down the grinding mechanism and the drying component of the food recycler (1412). Further, the controller can indicate completion of the food recycling cycle (1414) to complete the set of operations of the method 1400. For instance, the controller may transmit, using an antenna of the food recycler and over a communications network, a notification to another device to indicate that the food recycling cycle has been completed. Additionally, or alternatively, the controller may generate an audible notification, a visual indication, or a combination thereof to indicate that the food recycling cycle has been completed.

In some embodiments, the computer-readable storage devices, mediums, and/or memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

The invention claimed is:

1. A food recycler, comprising:
   a housing configured to be used on a countertop or table;
   a lid configured on a top portion of the housing;
   a controller comprising at least one user interface component usable to at least initiate a food recycling cycle, the controller being in the housing and the at least one user interface component being accessible from an exterior of the housing;
   a motor in electrical communication with the controller;
   a grinding mechanism in mechanical communication with the motor;
   a bucket contained within the food recycler, the bucket having a single hole at a top of the bucket for directly receiving food when the lid configured on the top portion of the housing is open and for unloading food, the bucket:
      comprising the grinding mechanism; and
      being configured with a volumetric capacity between 2.51 liters and 10 liters, wherein the motor is positioned on at least in part adjacent to a side wall of the bucket and within the housing, and wherein a ratio of the volumetric capacity of the bucket to a volume of the housing is between 0.0717 and 0.2857; and
   a filter system configured in the lid and that accommodates one or more air filters, the filter system being configured to enable the one or more air filters to be removably inserted into the lid.

2. The food recycler of claim 1, wherein the housing is configured with:
   a height between 324 millimeters and 396 millimeters;
   a length between 165 millimeters and 329 millimeters; and
   a width between 165 millimeters and 329 millimeters.

3. The food recycler of claim 1, further comprising:
   a drying component configured to remove water from waste food item, wherein the drying component comprises a fan in electrical communication with the controller to draw air from the bucket and through the filter system.

4. The food recycler of claim 1, further comprising a gear box configured below the bucket within the housing.

5. The food recycler of claim 1, wherein the food recycling cycle consumes 0.1 kilowatt hours of energy per 100 grams of the waste food items.

6. The food recycler of claim 1, wherein the one or more air filters are configured in the lid such that air from the bucket travels through the one or more air filters in the lid and out an opening on a top surface of the lid.

7. The food recycler of claim 1, further comprising an antenna in electrical communication with the controller, the antenna configured to allow wireless communication between the controller and other devices over a communications network.

8. The food recycler of claim 1, further comprising an RF component in electrical communication with the controller, wherein the RF component transmits microwaves into the bucket to heat the waste food items.

9. The food recycler of claim 1, further comprising at least one exhaust port connected to a first end of the filter system to allow release of odorless air from the lid.

10. A food recycler, comprising:
    a housing;
    a removable filter;
    a lid configured on a top portion of the housing, the lid comprising an interior cavity for receiving the removable filter, a first opening on a bottom surface of the lid and a second opening on a top surface of the lid;
    a controller comprising at least one user interface component being accessible from an exterior of the housing;
    a motor in electrical communication with the controller;
    a grinding mechanism in mechanical communication with the motor; and
    a bucket contained within the food recycler, the bucket having a single hole at a top of the bucket for directly receiving food when the lid is open, wherein, when the lid is closed and the food recycler operates, air flows from the bucket through the first opening on the bottom surface of the lid, through the removable filter configured in the lid, and out the second opening on the top surface of the lid.

11. The food recycler of claim 10, wherein the interior cavity of the lid, configured for receiving the removable filter, is accessible from the top surface of the lid.

12. The food recycler of claim 10, wherein the removable filter comprises an active carbon material.

13. The food recycler of claim 10, wherein a second removable filter is further configured within the lid in addition to the removeable filter.

14. A method comprising:
    receiving food items within a bucket of a food recycler, the food recycler having a housing, a removable filter, a lid configured on a top portion of the housing, the lid comprising an interior cavity for receiving the removable filter, a first opening on a bottom surface of the lid and a second opening on a top surface of the lid, a controller comprising at least one user interface component being accessible from an exterior of the housing, a motor in electrical communication with the controller, a grinding mechanism in mechanical communication with the motor and a bucket contained within the food recycler, the bucket having a single hole at a top of the bucket for directly receiving food when the lid is open;
    initiating a recycling process to recycle the food items within the bucket of the food recycler; and
    when the lid is closed for operating the recycling process, causing air to flow from the bucket through the first opening on the bottom surface of the lid, through the removable filter configured in the lid, and out the second opening on the top surface of the lid.

\* \* \* \* \*